(12) United States Patent
Ariyoshi

(10) Patent No.: US 6,871,536 B2
(45) Date of Patent: Mar. 29, 2005

(54) TEMPERATURE AVERAGING FLUID FLOW MEASURING APPARATUS

(75) Inventor: Yuji Ariyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 293 days.

(21) Appl. No.: 10/082,191

(22) Filed: Feb. 26, 2002

(65) Prior Publication Data

US 2003/0041664 A1 Mar. 6, 2003

(30) Foreign Application Priority Data

Aug. 22, 2001 (JP) ........................................ 2001-251434

(51) Int. Cl.[7] .................................................. G01F 1/68
(52) U.S. Cl. .................................................. 73/204.26
(58) Field of Search .......................... 73/204.26, 202.5, 73/204.11, 204.25

(56) References Cited

U.S. PATENT DOCUMENTS

| | | | |
|---|---|---|---|
| 4,501,144 A | | 2/1985 | Johnson et al. |
| 5,291,781 A | | 3/1994 | Nagata et al. |
| 5,369,994 A | | 12/1994 | Hecht et al. |
| 5,936,157 A | | 8/1999 | Yamashita et al. |
| 5,965,811 A | * | 10/1999 | Kawai et al. ............ 73/204.26 |
| 6,729,183 B2 | * | 5/2004 | Tanimoto et al. ........ 73/204.26 |

FOREIGN PATENT DOCUMENTS

JP          5-7659         1/1993

OTHER PUBLICATIONS

Lammerink et al., "A New Class Of Thermal Flow Sensors Using ΔT=0 As A Control Signal", IEEE, 2000, pp. 525–530.

* cited by examiner

*Primary Examiner*—Edward Lefkowitz
*Assistant Examiner*—Corey D. Mack
(74) *Attorney, Agent, or Firm*—Leydig, Voit & Mayer, Ltd.

(57) ABSTRACT

A fluid flow measuring method and apparatus with high sensitivity, quick response, and a wide dynamic range measures the flow of a fluid based on a difference in radiation of heat at an upstream side and a downstream side of a heating member located in the flow of the fluid. The apparatus includes a heating member; an upstream temperature sensor located on the upstream side of the heating member for measuring a first temperature; a downstream temperature sensor located on the downstream side of the heating member for measuring a second temperature; and a circuit for controlling power supplied to the heating member to maintain an average temperature of the first temperature measured by the upstream temperature sensor and the second temperature measured by the downstream temperature sensor at a fixed temperature.

8 Claims, 25 Drawing Sheets

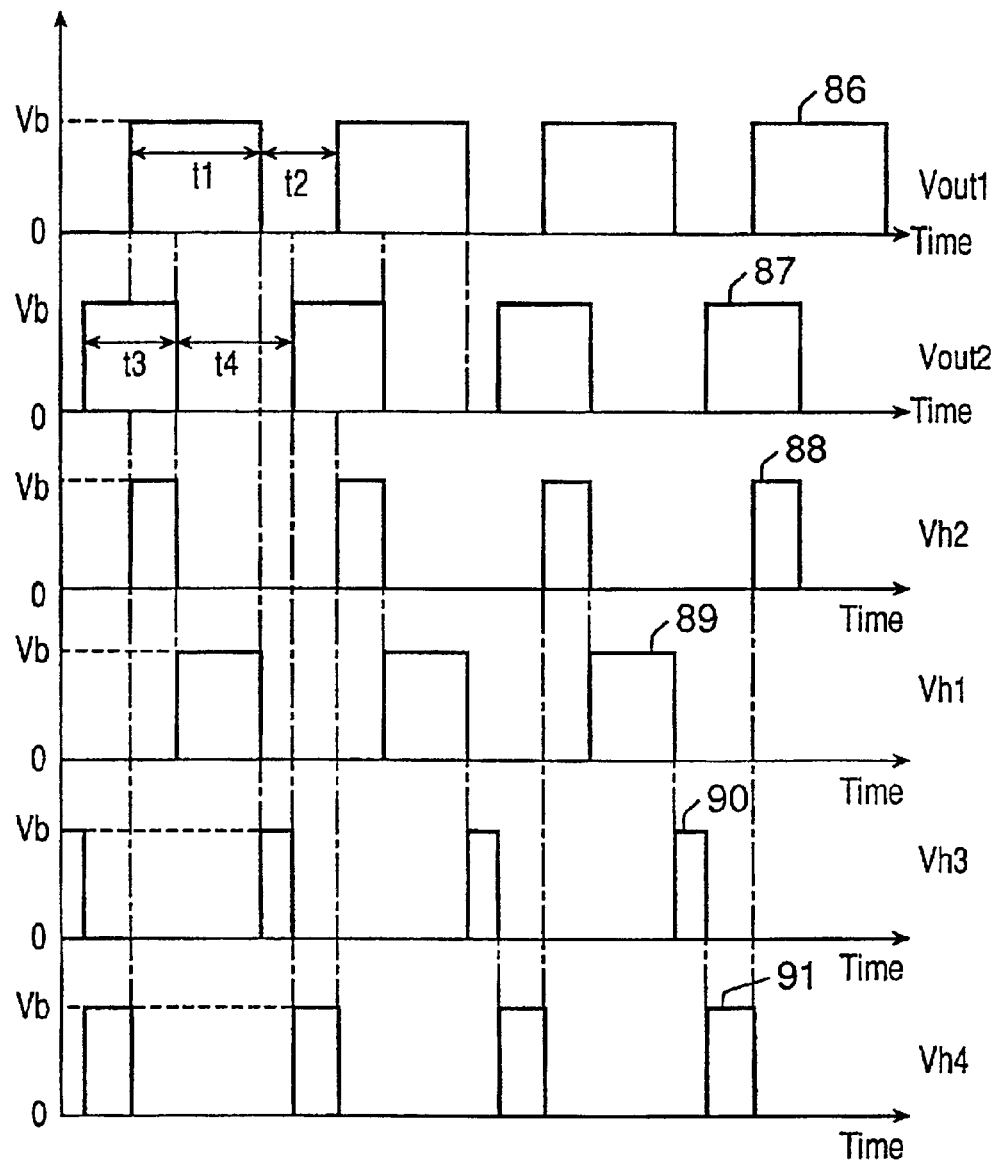

TEMPERATURE AVERAGING FLUID FLOW MEASURING APPARATUS

BACKGROUND OF THE INVENTION

1. Field of the Invention

The present invention relates to measure flow of fluid.

2. Description of the Background Art

Methods for measuring the flow of fluid are generally classified into two types; heating current measurement and temperature difference measurement.

The heating current measuring method includes detecting a heating current required for maintaining a heating resistor at a constant temperature level to measure flow of the fluid. On the other hand, the temperature difference measuring method includes keeping the temperature of a heating resistor at a constant level and detecting a difference in the temperature between an upstream temperature sensing resistor provided in the upstream side and a downstream temperature sensing resistor provided in the downstream side of the heating resistor to measure the flow of the fluid. Such a temperature difference measuring method is disclosed in the form of a fluid flow measuring apparatus in Japanese Patent Publication No. 5-7659(1993).

The two conventional methods described above have the following drawbacks respectively.

A fluid flow measuring apparatus implementing the heating current measuring method is unfavorable in the downsizing and may measure a small rate of the flow with much difficulty.

On the other hand, a fluid flow measuring method employing the temperature difference measuring method is favorable in the downsizing and can measure a small rate of the flow. However, when the fluid flow is increased, the temperature of the upstream temperature sensing resistor remains not further declined, and that of the downstream temperature sensing resistor may further be declined. This will lower the sensitivity and narrow the dynamic range when the flow of fluid increases. As the temperature of the temperature sensing resistor is varied by a change in the flow, the response of the apparatus is also declined.

SUMMARY OF THE INVENTION

It is hence an object of the present invention to provide a fluid flow measuring method which is favorable in the downsizing, improves sensitivity and the response, and widens the dynamic range.

A flow measuring apparatus according to the present invention measures flow of fluid based on a difference in radiation of heat between an upstream side and a downstream side of a heating member provided in the fluid. The apparatus includes an upstream temperature sensor provided on the upstream side of the heating member, which measures first temperature, and a downstream temperature sensor provided on the downstream side of the heating member, which measures second temperature. The apparatus further includes a circuit, which controls power to the heating member to maintain an average temperature level of the first temperature measured by the upstream temperature sensor and the second temperature measured by the downstream temperature sensor at a predetermined level. The above object can be achieved by this arrangement.

Alternatively, the flow of the fluid may be calculated from the difference between the first temperature measured by the upstream temperature sensor and the second temperature measured by the downstream temperature sensor.

The flow measuring apparatus may further include: an upstream heating member provided between the heating member and the upstream temperature sensor, which generates heat based on the power controlled by the circuit; and a downstream heating member provided between the heating member and the downstream temperature sensor, which generates heat based on the power controlled by the circuit. The circuit controls respective power to the upstream heating member and to the downstream heating member to maintain the first temperature measured by the upstream temperature sensor and the second temperature measured by the downstream temperature sensor substantially equal and measures the flow of the fluid based on the difference between the respective power.

The circuit may be arranged to modify the predetermined level based on temperature of the fluid.

The circuit may be arranged to modify the predetermined level based on the flow of the fluid.

Moreover, another flow measuring apparatus according to the present invention is provided. The apparatus measures flow of fluid based on a difference in radiation of heat between an upstream side and a downstream side of a heating member provided in the fluid. The apparatus includes a first, a second, a third, a fourth, a fifth, and a sixth thermally sensitive resistors provided in a row from upstream to downstream. Each resistor has functions as a heater for generating heat and as a temperature sensor for measuring temperature. The apparatus further includes a circuit which controls power to each thermally sensitive resistor to heat. The circuit controls respective power to the third and the fourth thermally sensitive resistors to maintain heated temperature levels of the second and the fifth thermally sensitive resistors substantially equal. The circuit further controls respective power to the second and the fifth thermally sensitive resistors to maintain heated temperature levels of the first and the sixth thermally sensitive resistors substantially equal. The circuit measures the flow of the fluid based on the difference between the respective power to the third and the fourth thermally sensitive resistors and the difference between the respective power to the second and the fifth thermally sensitive resistors. According to the above arrangement, the above object can also be achieved.

Alternatively, the apparatus may further include a heating resistor provided between the third and the fourth thermally sensitive resistors. The circuit controls power to the heating resistor to maintain an average temperature level of the first and the sixth thermally sensitive resistors at a predetermined level.

The circuit may be arranged to modify the predetermined level based on temperature of the fluid.

The advantages of the present invention are as follows.

As the power supply to the heating member is controlled by the control circuit so as to maintain the average of temperature measurements of the two sensors at a predetermined level, the temperature level of both the upstream and the downstream temperature sensors can remain high even if the flow is increased. This contributes to the improvement of the sensitivity at a large quantity of the flow and the increase of the dynamic range. The apparatus also allows the temperature measurements of the upstream and downstream temperature sensors to be subjected to feed-back controlling, hence improving its response as compared with a conventional open-loop apparatus.

As the temperature levels of the upstream and the downstream, temperature sensors remains constant regardless of increase of the flow of the fluid, the response of the apparatus can be improved. Further, the upstream and the downstream, heating elements are provided and allow the upstream and downstream sensors to remain at higher temperature levels, thus increasing the sensitivity at a large rate of the flow and widening the dynamic range.

As the difference in the temperature between the sensors and the fluid remains not depending on the temperature of the fluid, the flow can steadily be measured regardless of any change in the fluid temperature. The output signal is linear in relation to the flow, thus minimizing any error caused by pulsating flows.

The difference in the output voltage of the second and fifth temperature sensing resistors out of the six temperature sensing resistors aligned along a flow path from upstream to downstream varies widely when the flow is low. On the other hand, the difference in the output voltage of the third and fourth temperature sensing resistors varies widely when the flow is high. Thus, measurement of flow can be achieved with high sensitivity and wide flow range. This permits the temperature measurements of the upstream and downstream temperature resistors to be feed-back controlled thus improving the response of the apparatus.

Even when the flow increases, the first to sixth temperature sensing resistors remain high in the temperature level. This can effectively increases the sensitivity at a large quantity of the flow and widens the dynamic range. Moreover, the upstream and the downstream temperature sensing resistors remain constant in the temperature levels, hence improving the response of the apparatus.

As the difference in the temperature between the resistors and the flow remains constant not depending on the temperature of the fluid, the flow can steadily be measured regardless of any change in the fluid temperature.

BRIEF DESCRIPTION OF THE DRAWINGS

These and other object and features of the present invention will become clear from the following description taken in conjunction with the preferred embodiments thereof with reference to the accompanying drawings, in which:

FIG. 27 is a diagram of the relationship between the terminal voltages of resistors 68 to 71 (FIG. 26) and the voltages of output terminals 16 and 81 (FIG. 26);

FIG. 28 is a diagram of the relationship between Vout1, Vout2, and Vh1 to Vh4;

DETAILED DESCRIPTION OF THE PREFERRED EMBODIMENTS

Some embodiments of the present invention will be described referring to the accompanying drawings. Same functional components are denoted by same numerals throughout the drawings.

Embodiment 1

Figure 1:
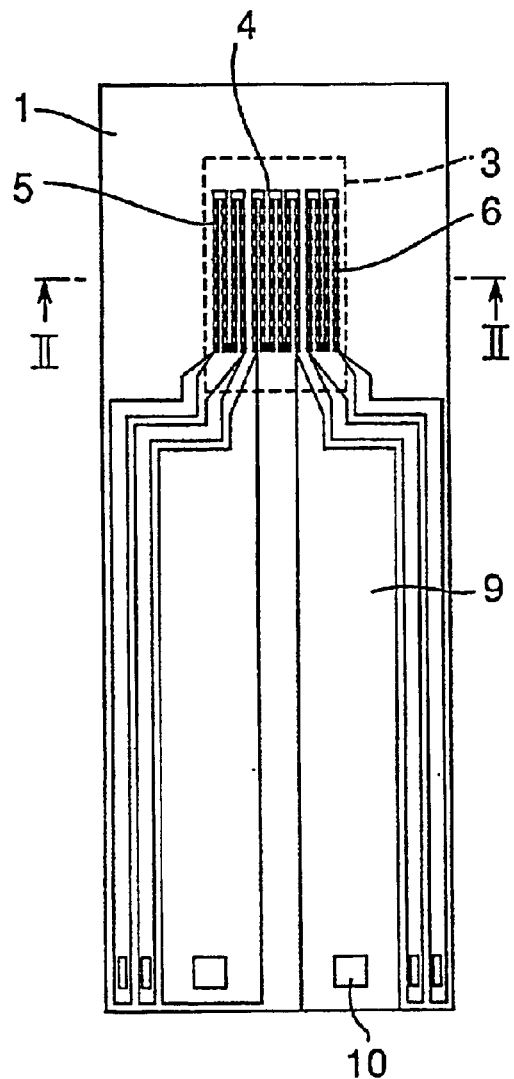
FIG. 1 is a diagram of a sensing section of a fluid flow measuring apparatus according to Embodiment 1 of the present invention.
Figure 2:
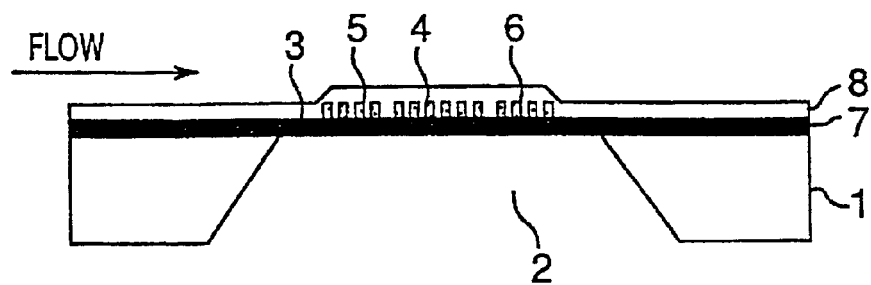
FIG. 2 is a cross sectional view of a thinned region 3.

FIG. 1 illustrates a sensing section of a fluid flow measuring apparatus of Embodiment 1 of the present invention. The fluid flow measuring apparatus has a heating resistor 4 made of a temperature sensitive material such as platinum, an upstream temperature sensing resistor 5 and a downstream temperature sensing resistor 6 as temperature sensors, all mounted on a thinned region 3 of a silicon substrate 1 thereof. The resistors 4, 5, and 6 are connected with wirings 9 which are linked at the other end to pads 10. The pads 10 are connected to an external circuit by wire bonding or the like. FIG. 2 is a cross sectional view of the thinned region 3 taken along the line II—II of FIG. 1. The thinned region 3 includes a pair of insulating layers 7 and 8 between which the resistors 4, 5, and 6 are provided. The thinned region 3 has a portion of silicon removed by etching from the back side thereof thus forming a blank space 2.

The principle of operation of the fluid flow measuring apparatus for measuring the speed of fluid (e.g. air) will be explained below. First, the heating resistor 4 is heated up to a temperature higher than that of the silicon substrate 1 (for example, 200° C.). It is understood that the temperature of the silicon substrate 1 is substantially equal to that of the air passing by. When the flow of air is absent, the heat generated by the heating resistor 4 is equally transmitted to both the upstream and the downstream temperature sensing resistors 5 and 6. This is true because the upstream and the downstream temperature sensing resistors 5 and 6 are arranged symmetrical with respect to the heating resistor 4 as shown. At the time, there is no difference in the temperature between the upstream and the downstream temperature sensing resistors 5 and 6, hence producing no difference in the resistance. It is now assumed that the flow of air runs in a direction denoted by the arrow FLOW in FIG. 2. As the flow of air towards the heating resistor 4 draws heat from and thus cools down the upstream temperature sensing resistor 5 located at the upstream, it transfers the heat to the downstream temperature sensing resistor 6 located at the downstream. A resultant difference in the temperature between the two temperature sensing resistors 5 and 6 is translated to a difference in the resistance and voltage from which the flow and the speed of air are calculated.

Figure 3:
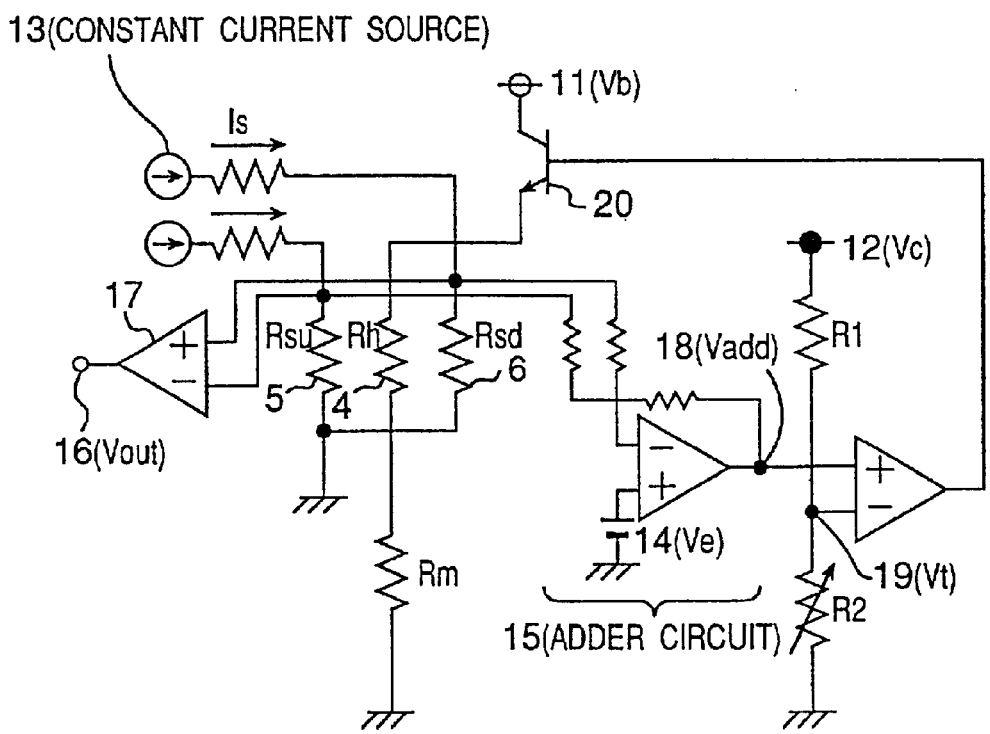
FIG. 3 is a circuit diagram of the fluid flow measuring apparatus with resistors 4, 5, and 6 of Embodiment 1.

FIG. 3 is a circuit diagram of the fluid flow measuring apparatus with the resistors 4, 5, and 6 of Embodiment 1. The upstream temperature sensing resistor 5 (Rsu) and the downstream temperature sensing resistor 6 (Rsd) are connected to and supplied a constant current is from a constant current source 13. Two voltages (Vsu and Vsd) measured across their corresponding resistors Rsu5 and Rsd6 are received by an adder circuit 15. Assuming that the gain of the adder circuit 15 is G, an output voltage Vadd of the adder circuit 15 is expressed by:

$$V_{add} = Ve - G(Vsu + Vsd) \quad \text{(Equation 1)}$$

The output voltage Vadd of the adder circuit 15 is compared with a voltage 19 (Vt) produced by dividing a constant voltage 12 (Vc) using two fixed resistors R1 and R2. The heating resistor 4 is then supplied with such a level of power from a power transistor 20 that the two voltages are equal to each other. The voltage Vt produced by dividing the constant voltage Vc is expressed by:

$$Vt = \frac{R_2}{R_1 + R_2} Vc \quad \text{(Equation 2)}$$

When Vt=Vadd, the following equation is established from Equations 1 and 2.

$$G(Vsu + Vsd) = Ve - \frac{R_2}{R_1 + R_2} Vc \quad \text{(Equation 3)}$$

Assuming that the resistance of the two temperature sensing resistors 5 and 6 is Rs0 at a temperature of 0° C., the resistance temperature factor is αs, and the temperatures are Tsu and Tsd respectively, the two voltages Vsu and Vsd across their respective resistors Rsu5 and Rsd6 are calculated from Equations 4 and 5 respectively, $$Vsu = RsuIs = R_{s0}(1 + \alpha_s Tsu)Is \quad \text{(Equation 4)}$$

$$Vsd = RsdIs = R_{s0}(1 + \alpha_s Tsd)Is \quad \text{(Equation 5)}$$

Then, the following is established as:

$$G(Vsu + Vsd) = G\{(2R_{s0} + \alpha_s(Tsu + Tsd))\}Is \quad \text{(Equation 6)}$$
$$= 2GR_{s0}Is + G\alpha_s(Tsu + Tsd)Is$$

The following equation is further established from Equations 3 and 6.

$$\frac{1}{2}(Tsu + Tsd) = \left[Ve - \frac{R2}{R1 + R2}Vc - 2GR_{s0}Is\right] \bigg/ 2G\alpha_s Is \quad \text{(Equation 7)}$$

The terms on the right-hand side of Equation 7 are all constants; therefore right-hand side of the Equation 7 is constant. Accordingly, the circuitry arrangement shown in FIG. 3 can be utilized for maintaining the average of the temperature levels Tsu and Tsd of the upstream and the downstream, temperature sensing resistors 5 and 6 at a constant level.

Referring further to FIG. 3, the two temperature sensing resistors 5 and 6 are connected to a differential amplifier 17. The differential amplifier 17 releases a potential difference between the two voltages Vsu and Vsd measured across the two resistors Rsu5 and Rsd6 as its output voltage Vout from its terminal 16. More specifically, the output voltage Vout is expressed by:

$$Vout = Vsd - Vsu \quad \text{(Equation 8)}$$
$$= R_{s0}\alpha_s(Tsd - Tsu)Is$$

As apparent from Equation 8, the output voltage Vout is proportional to a difference between the temperature Tsu of the upstream temperature sensing resistor 5 and the temperature Tsd of the downstream temperature sensing resistor 6.

Commonly used for calculating the flow of the fluid from the output voltage Vout is a table indicating the relationship between the flow and the output voltage. The table may be stored in a memory (not shown) which is built in the fluid flow measuring apparatus. The operation of referring the table may be conducted by a central operating unit (not shown) provided in the fluid flow measuring apparatus. Alternatively, the table may be replaced by a mathematical function where the output voltage Vout is used as a variable to calculate the flow as an output value.

Figure 4:
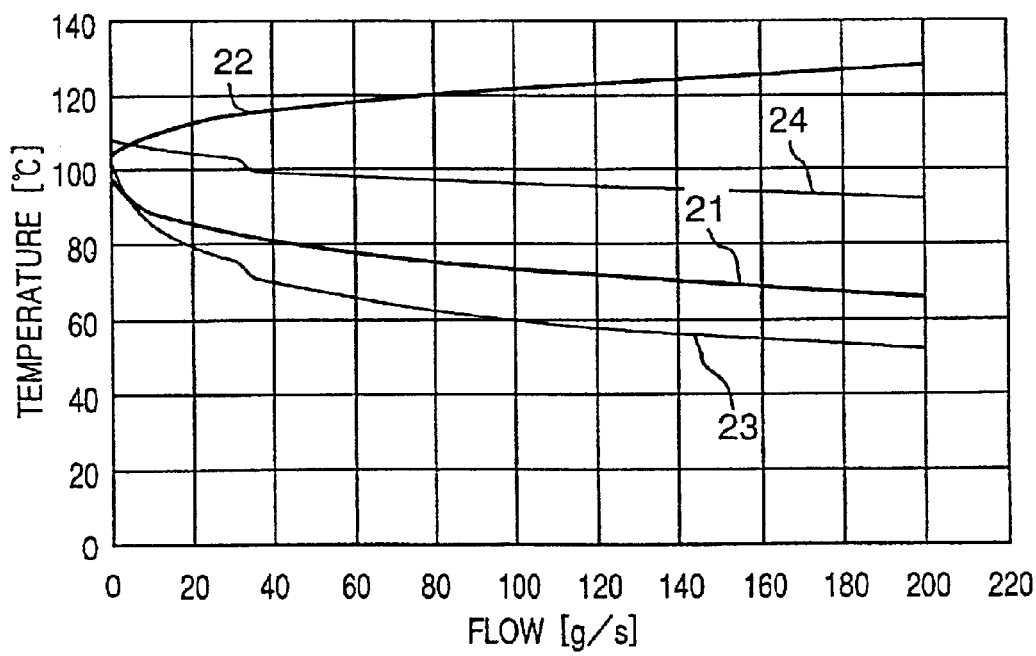
FIG. 4 is a graphic diagram of the temperature levels of the upstream temperature sensing resistor 5 and the downstream temperature sensing resistor 6 with relation to the flow of fluid.

FIG. 4 is a graphic diagram showing a profile of the temperature of the upstream and the downstream temperature sensing resistors 5 and 6 in relation to the flow of the fluid. The profile is based on the result of simulation by a thermal circuit network scheme. The curves 21 and 22 represent the temperatures of the two, upstream and downstream, temperature sensing resistors 5 and 6 respectively according to Embodiment 1. On the other hand, the curves 23 and 24 represent the temperatures of an upstream and a downstream temperature sensing resistors 5 and 6 in a conventional flow measuring apparatus. As the flow of fluid increases, both the temperatures of the upstream and downstream temperature sensing resistors 5 and 6 in the conventional flow measuring apparatus are declined and so their average level. As described with Equation 7, the upstream and the downstream temperature sensing resistors 5 and 6 in this embodiment are controlled to keep their temperature average at a constant level. This allows the temperature (denoted by the curve 22) of the downstream temperature sensing resistor 6 to be increased while the temperature (denoted by the curve 21) of the upstream temperature sensing resistor 5 is declined as the flow increases.

A decrease by the flow in the temperature (denoted by the curve 21) of the upstream temperature sensing resistor 5 in this embodiment is smaller than that (denoted by the curve 23) of the upstream temperature sensing resistor 5 in the conventional apparatus. Accordingly, when the flow increases and reaches at a significant rate, the temperature of the upstream temperature sensing resistor 5 in this embodiment becomes higher than that of the upstream temperature sensing resistor 5 in the conventional apparatus. When measurable levels of the temperature are limited in a predetermined range and the lower limit of the range is 65° C., the flow can be measured up to a rate of about 60 g/s by the conventional apparatus as apparent from the curve 23. The apparatus of Embodiment 1 can however measure as a high rate as 200 g/s. The upstream temperature sensing resistor 5 in this embodiment 1 is thus capable of measuring a greater rate of the flow than that of the conventional apparatus.

Figure 5:
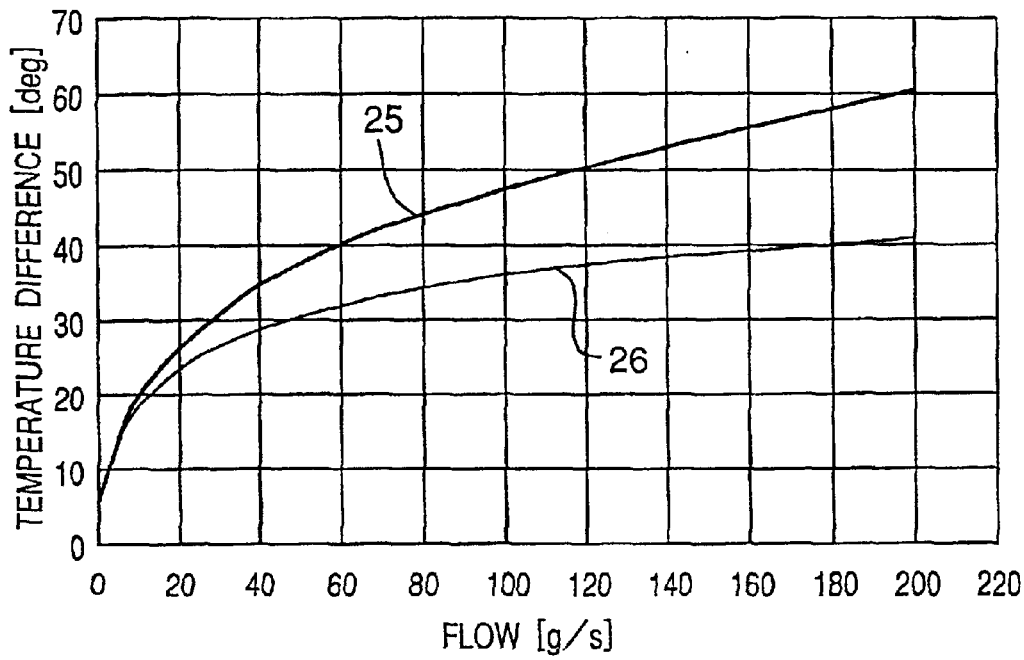
FIG. 5 is a graphic diagram of the dependency on the flow of a difference in the temperature between the upstream temperature sensing resistor 5 and the downstream temperature sensing resistor 6.

FIG. 5 is a graphic diagram showing the dependency on the flow of a difference in the temperature between the upstream temperature sensing resistor 5 and the downstream temperature sensing resistor 6. The curve 25 represents a difference in the temperature between the upstream temperature sensing resistor 5 and the downstream temperature sensing resistor 6 in Embodiment 1. The curve 26 represents a difference in the temperature between the upstream temperature sensing resistor and the downstream temperature sensing resistor in the conventional apparatus. As described above, the temperature of the upstream temperature sensing resistor 5 in Embodiment 1 remains variable at a larger rate of the flow while the temperature of the downstream temperature sensing resistor 6 of the present invention increases with the flow. Accordingly, the temperature difference can stay variable at a greater rate of the flow than that in the conventional apparatus and its dependency on the flow will be higher.

The apparatus of Embodiment 1 allows the temperature difference between the upstream temperature sensing resistor 5 and the downstream temperature sensing resistor 6 to remain variable at greater rate of flow than that in the conventional apparatus. As a result, the sensitivity for measurement can be improved at a higher range of the flow rate, hence contributing to the greater dynamic range of the apparatus. Moreover, as the temperatures of the upstream and the downstream, temperature sensing resistors 5 and 6 are subjected to feed-back controlling, the apparatus can be higher in the response than that any conventional open-loop apparatus.

Embodiment 2

As shown in FIG. 3, Embodiment 1 employs the adder circuit 15 for calculating the average temperature of the upstream temperature sensing resistor 5 and the downstream temperature sensing resistor 6. Embodiment 2 however utilizes another circuit with equal success as will be explained below.

Figure 6:
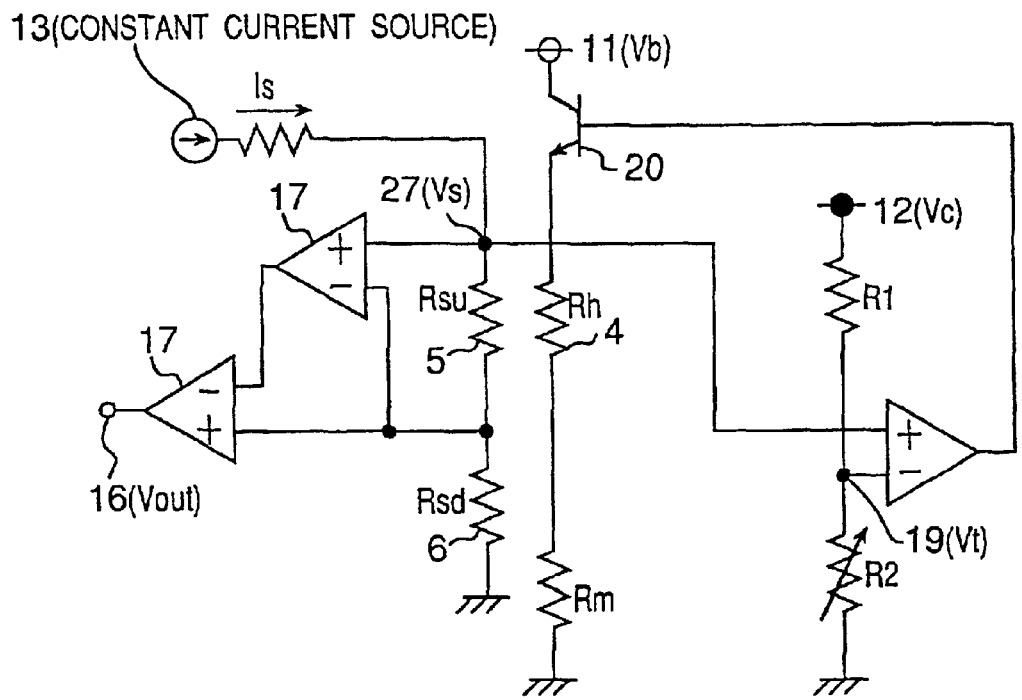
FIG. 6 is a circuit diagram of a fluid flow measuring apparatus with resistors 4, 5, and 6 according to Embodiment 2.

FIG. 6 is a circuit diagram of a fluid flow measuring apparatus with resistors 4, 5, and 6 according to Embodiment 2 of the present invention. As shown in FIG. 6, the upstream temperature sensing resistor 5 is connected at one end in series with the downstream temperature sensing resistor 6 and at the other end with a constant current source 13 which feeds a constant current Is. The voltage 27 (Vs) at the high potential side of the upstream and the downstream temperature sensing resistors 5 and 6 is expressed by:

$$Vs = (Rsu + Rsd)Is \quad \text{(Equation 9)}$$
$$= 2R_{s0}Is + R_{s0}\alpha_s(Tsu + Tsd)Is$$

Similar to Vadd in Embodiment 1, the voltage 27 depends on (Tsu+Tsd).

A differential amplifier 17 produces a difference between the voltage across the upstream temperature sensing resistor 5 and the voltage across the downstream temperature sensing resistor 6.

This arrangement allows a difference in the temperature between the upstream temperature sensing resistor 5 and the downstream temperature sensing resistor 6 to remain variable at a greater quantity of the flow than that in the conventional apparatus. Accordingly, the sensitivity for measurement will be improved at a higher range of the flow quantity thus contributing to the wider dynamic range of the apparatus.

In each arrangement of Embodiments 1 and 2, the constant current source 13 is used for supplying a constant current to the upstream and the downstream temperature sensing resistors 5 and 6. Alternatively, a constant voltage source may be employed with equal success. Moreover, as the temperatures of the upstream and the downstream temperature sensors 5 and 6 are subjected to feed-back controlling, the apparatus can be higher in the response than any conventional open-loop apparatus.

Embodiment 3

Figure 7:
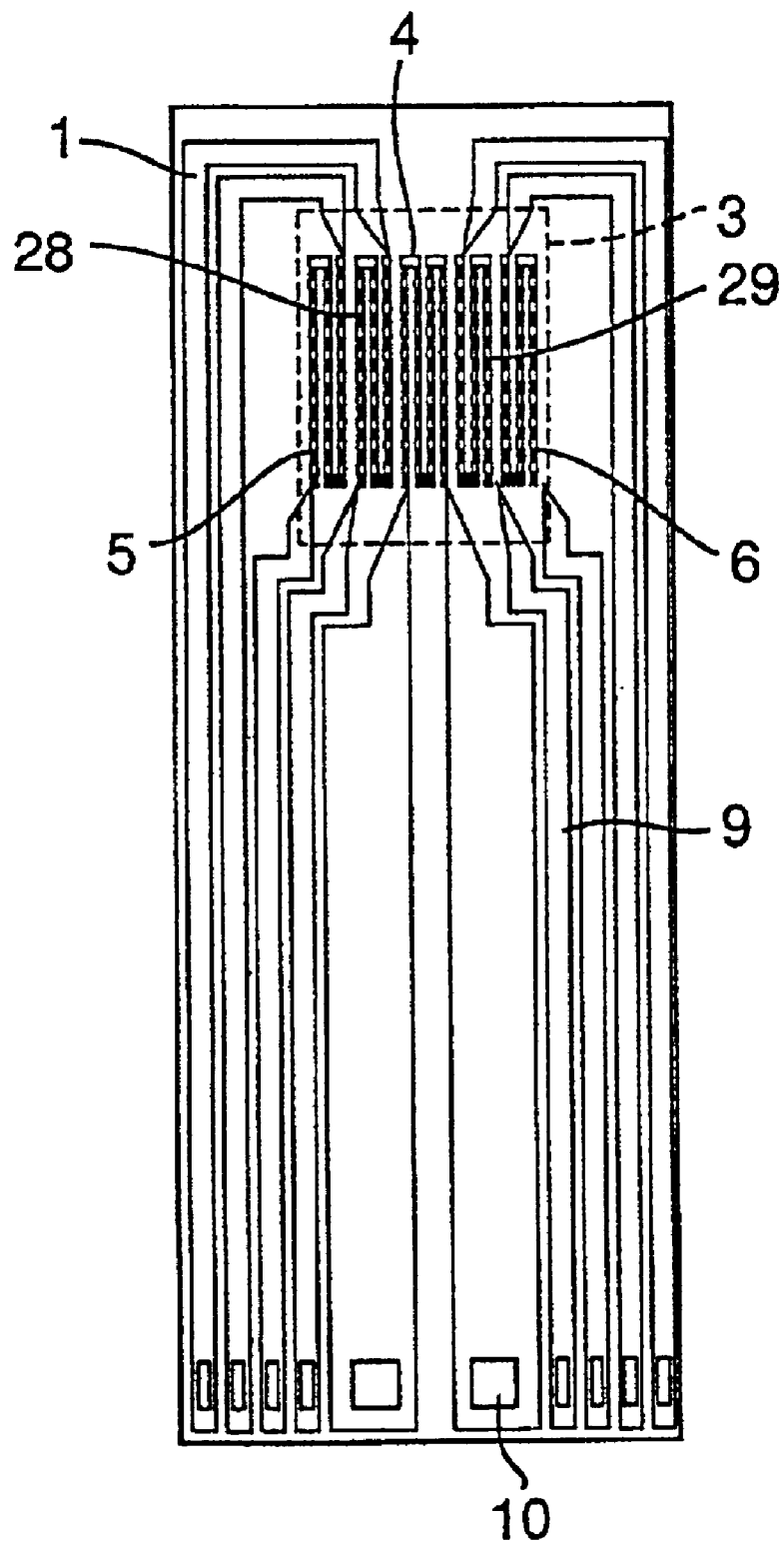
FIG. 7 is a diagram of a sensing section of a fluid flow measuring apparatus according to Embodiment 3.

FIG. 7 illustrates a sensing section of a fluid flow measuring apparatus of Embodiment 3 of the present invention. The fluid flow measuring apparatus has a center heating resistor 4, an upstream temperature sensing resistor 5, a downstream temperature sensing resistor 6, an upstream heating resistor 28, and a downstream heating resistor 29, which are mounted on a thinned region 3 of a silicon substrate 1 thereof. The upstream heating resistor 28 is connected (adjacent to and) between the center heating resistor 4 and the upstream temperature sensing resistor 5 while the downstream heating resistor 29 is connected (adjacent to and) between the center heating resistor 4 and the downstream temperature sensing resistor 6. The other components and their arrangement are identical to those shown in FIGS. 1 and 2.

In Embodiment 3, the similar circuit as the one shown in FIG. 3 is composed of the center heating resistor 4, the upstream temperature sensing resistor 5, and the downstream temperature sensing resistor 6 where a power input to the center heating resistor 4 is controlled to maintain the average of the temperature levels of the upstream temperature sensing resistor 5 and the downstream temperature sensing resistor 6 at a constant level.

Figure 8:
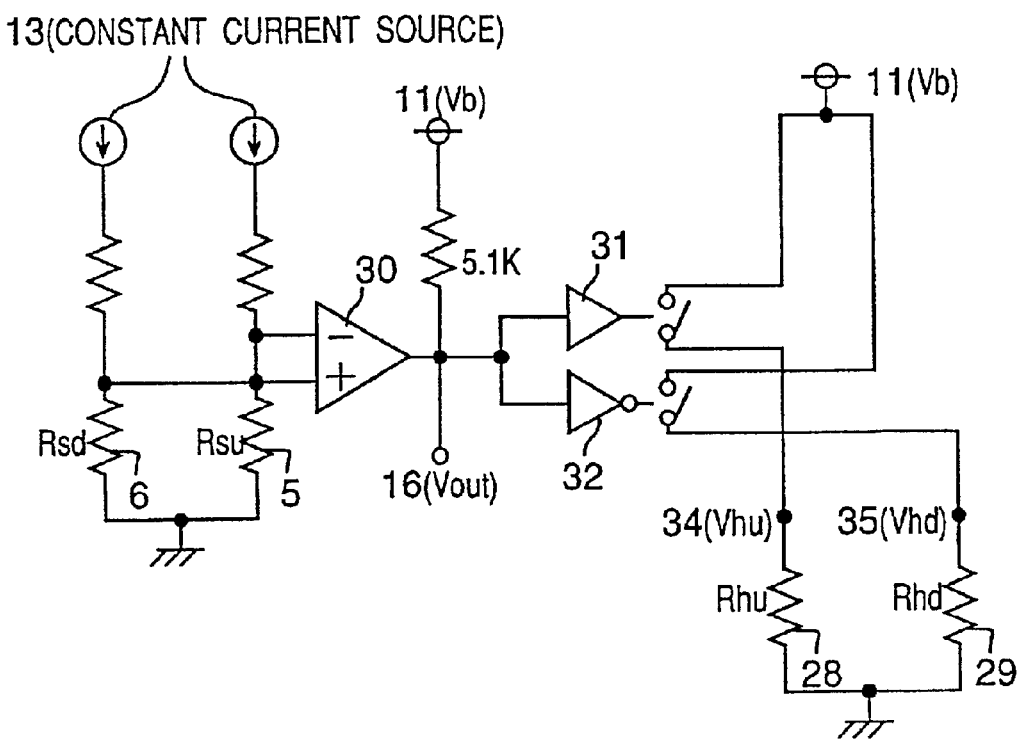
FIG. 8 is a circuit diagram of the fluid flow measuring apparatus with resistors 5, 6, 28, and 29 of Embodiment 3.

FIG. 8 is a circuit diagram of the fluid flow measuring apparatus with the resistors 5, 6, 28 and 29 of Embodiment 3. The upstream temperature sensing resistor 5 (Rsu) and the downstream temperature sensing resistor 6 (Rsd) are connected to and receive a constant current from a constant current source 13. As shown in FIG. 8, a voltage (Vsu) across the upstream temperature sensing resistor 5 and a voltage (Vsd) across the downstream temperature sensing resistor 6 are received by the negative input terminal and the positive input terminal of a comparator 30 respectively. The output of the comparator 30 is at a high level when the temperature of the upstream temperature sensing resistor 5 is lower than the temperature of the downstream temperature sensing resistor 6 (i.e. Vsu<Vsd) and at a low level when vice versa (i.e. Vsu>Vsd). The output of the comparator 30 is connected to a couple of switches 31 and 32. The switch 31 controls the connection between the upstream heating resistor 28 and a source 11 while the switch 32 controls the connection between the downstream heating resistor 29 and the source 11.

The operation of the circuit shown in FIG. 8 is now explained. When the flow of fluid starts, the temperature of the upstream temperature sensing resistor 5 becomes lower than the temperature of the downstream temperature sensing resistor 6. More specifically, the relationship between the two voltages is expressed by Vsu<Vsd. This causes the comparator 30 to release a high level output thus turn the switch 31 on and the switch 32 off. As a result, the upstream heating resistor 28 is conducted with the source 11. When the upstream heating resistor 28 is energized, it produces Joule heat and heats up the upstream temperature sensing resistor 5 adjacently located. As the temperature of the upstream temperature sensing resistor 5 becomes higher than that of the downstream temperature sensing resistor 6, the relationship between their respective voltages is turned to Vsu>Vsd. This causes the comparator 30 to release a low level output and turn the switch 31 off and the switch 32 on, thus conducting between the downstream heating resistor 29 and the source 11. When the downstream heating resistor 29 is energized, it produces Joule heat and heats up the downstream temperature sensing resistor 6 adjacently located. As the temperature of the downstream temperature sensing resistor 6 becomes higher than that of the upstream temperature sensing resistor 5, the relationship between their respective voltages is returned back to Vsu<Vsd of the initial state. The operation of the two switches 31 and 32 alternates the connection of the upstream heating resistor 28 and the downstream heating resistor 29 with the source 11 so that the upstream and the downstream temperature sensing resistors 5 and 6 are equal to each other in the temperature.

Figure 9:
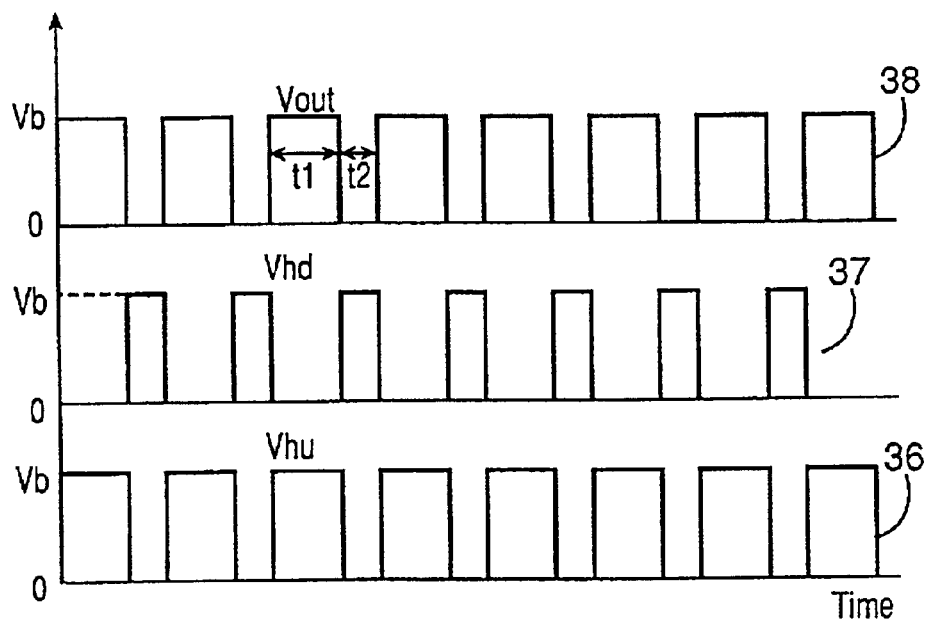
FIG. 9 is a diagram of the relationship between the terminal voltage levels of the resistors 28 and 29 (FIG. 8) and the voltage level of an output terminal 16 (FIG. 8)
Figure 10:
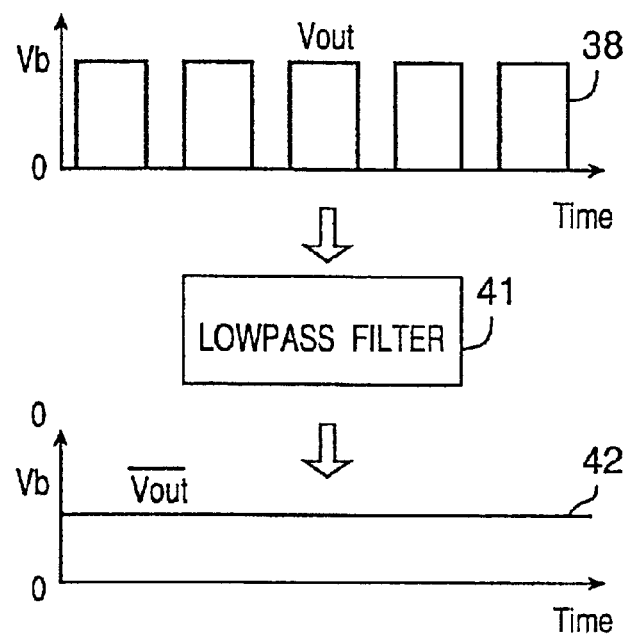
FIG. 10 is a diagram of a procedure of producing an analog output from the output voltage 38.

FIG. 9 illustrates the relationship between the terminal voltages across the resistors 28 and 29 (FIG. 8) and the voltage at an output terminal 16 (FIG. 8). More particularly, the voltage at the positive terminal 34 of the upstream heating resistor 28 (FIG. 8) is expressed by a train of pulses 36. The voltage at the positive terminal 35 of the downstream heating resistor 29 (FIG. 8) is expressed by a train of pulses 37. The voltage at the output terminal 16 (FIG. 8) is expressed by a train of pulses 38. When the fluid flows from the upstream, the upstream heating resistor 28 (FIG. 8) has to be energized by a greater level of power to have the upstream temperature sensing resistor 5 (FIG. 8) and the downstream temperature sensing resistor 6 (FIG. 8) set equal to each other in the temperature. Accordingly, the closing period t1 of the switch 31 (FIG. 8) is set longer than the closing period t2 of the switch 32 (FIG. 8). The difference (or a ratio) between the two periods will be greater when the flow increases. When the flow is reversed, this relationship is inverted. FIG. 10 illustrates a procedure of producing an analog output from the output voltage 38. As shown in FIG. 10, the output voltage 38 is converted into the analog voltage 42 by the operation of a lowpass filter 41. The voltage 42 is determined by a duty ratio, t1/(t1+t2), of the output voltage 38. Accordingly, the flow of the fluid can be translated from the voltage 42.

Figure 11:
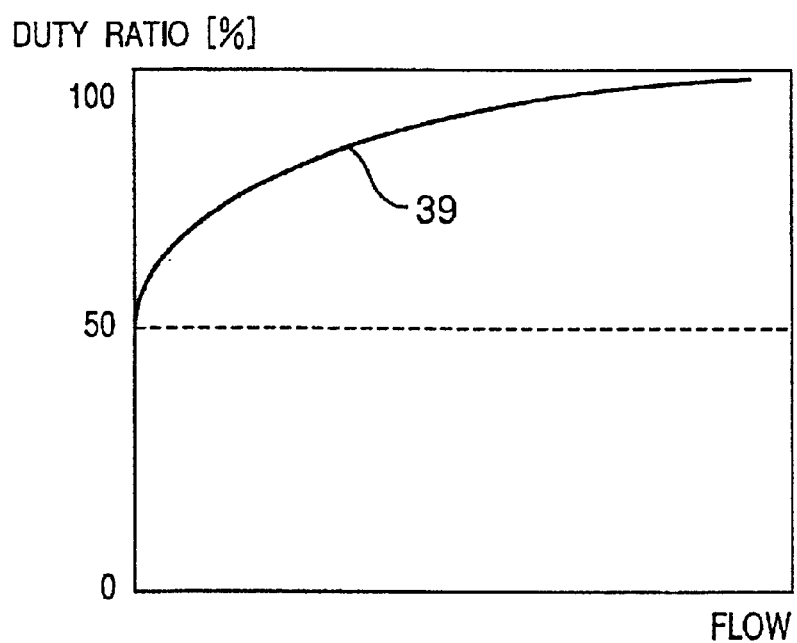
FIG. 11 is a graphic diagram of a profile 39 of the relationship between the flow and the duty ratio in Embodiment 3.

FIG. 11 illustrate a graphic profile 39 representing the relationship between the flow and the duty ratio. The duty ratio is 50% at zero of the flow and will be elevated as the flow increases. The flow at the duty ratio of 100% is controlled by adjusting the source voltage and/or the relationship between the upstream and downstream heating resistors and between the upstream and downstream temperature sensing resistors. When the output circuit shown in FIG. 10 is used, its output profile is equal to that shown in FIG. 11.

As the average of the temperature levels of the upstream and the downstream temperature sensing resistors 5 and 6 (FIG. 3) is maintained at a constant level and the upstream and the downstream temperature sensing resistors 5 and 6 are controlled to be equal in the temperature to each other by the circuitry arrangement shown in FIG. 8, the temperatures of the two resistors 5 and 6 can remain constant throughout a range of the flow rate.

As described above, Embodiment 3 allows the upstream and the downstream temperature sensing resistors 5 and 6 to remain constant in the temperature regardless of the flow, thus increasing the dynamic range of the apparatus. Further, as the temperature is not changed by variation of the flow, the apparatus can be improved in the response. Moreover, as the temperature of the resistors is kept 100° C. or higher, it can evaporate any drops of water instantly. Accordingly, unwanted drifts caused by the drops of water will be minimized.

Embodiment 4

Figure 12:
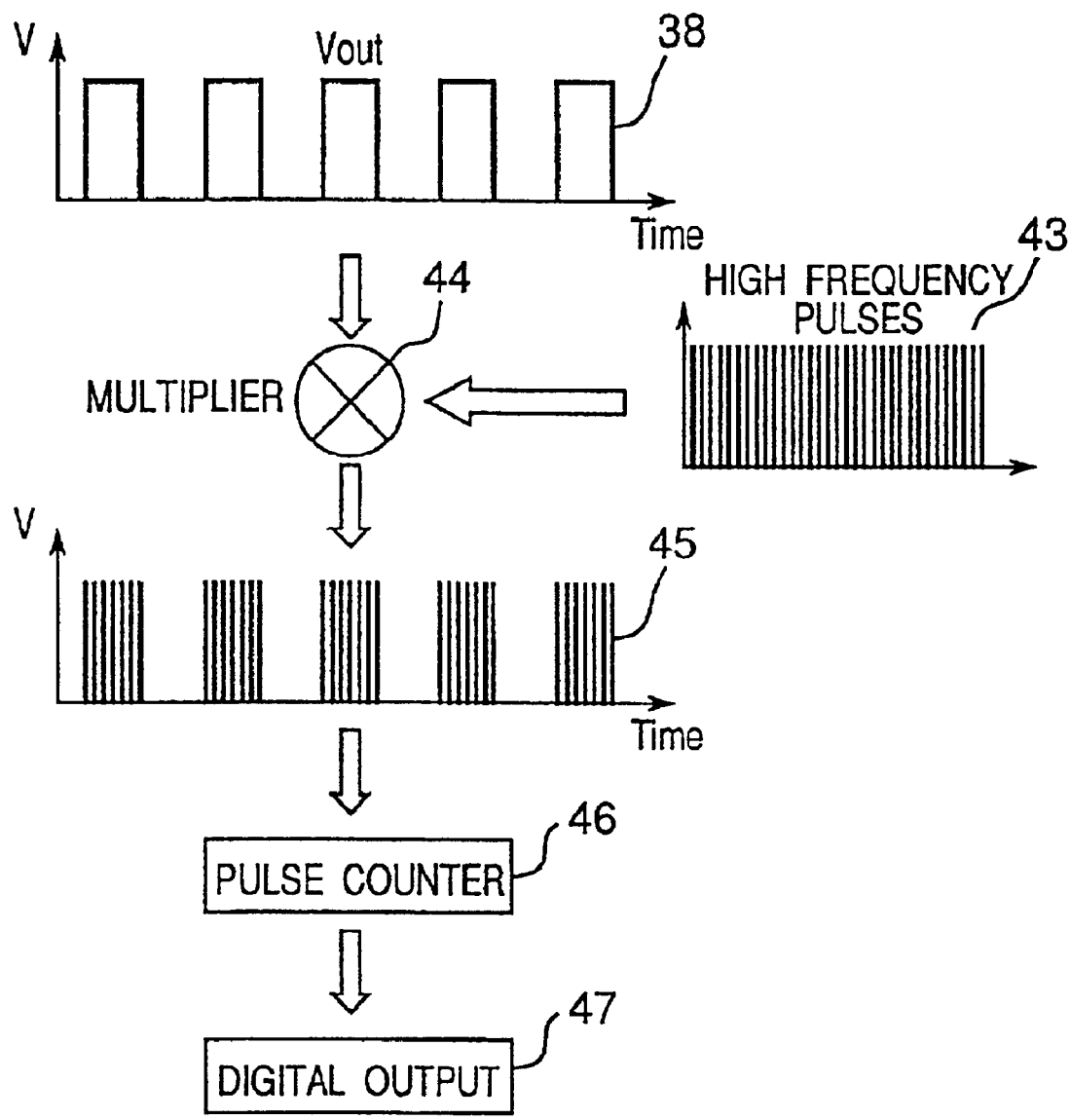
FIG. 12 is a diagram of a procedure of releasing the output voltage Vout shown in FIG. 10 in a digital form.

FIG. 12 illustrates a procedure of producing a digital output from the output voltage Vout illustrated in FIG. 10. When the output voltage 38 and a high-frequency pulse signal 43 are multiplied by a multiplier 44, a resultant output includes groups of high frequency pulses 45 preserved when the output voltage 38 is at high level (i.e., during the period t1 shown in FIG. 9). The groups of the high frequency pulses 45 are counted by a pulse counter 46 for a predetermined length of time to determine a digital signal 47.

As the output voltage is converted into its digital form, this embodiment offers the same effect as of Embodiment 3. Thus, easier application to a central processing unit (hereinafter referred to as a CPU) of a computer can be achieved.

Embodiment 5

Figure 13:
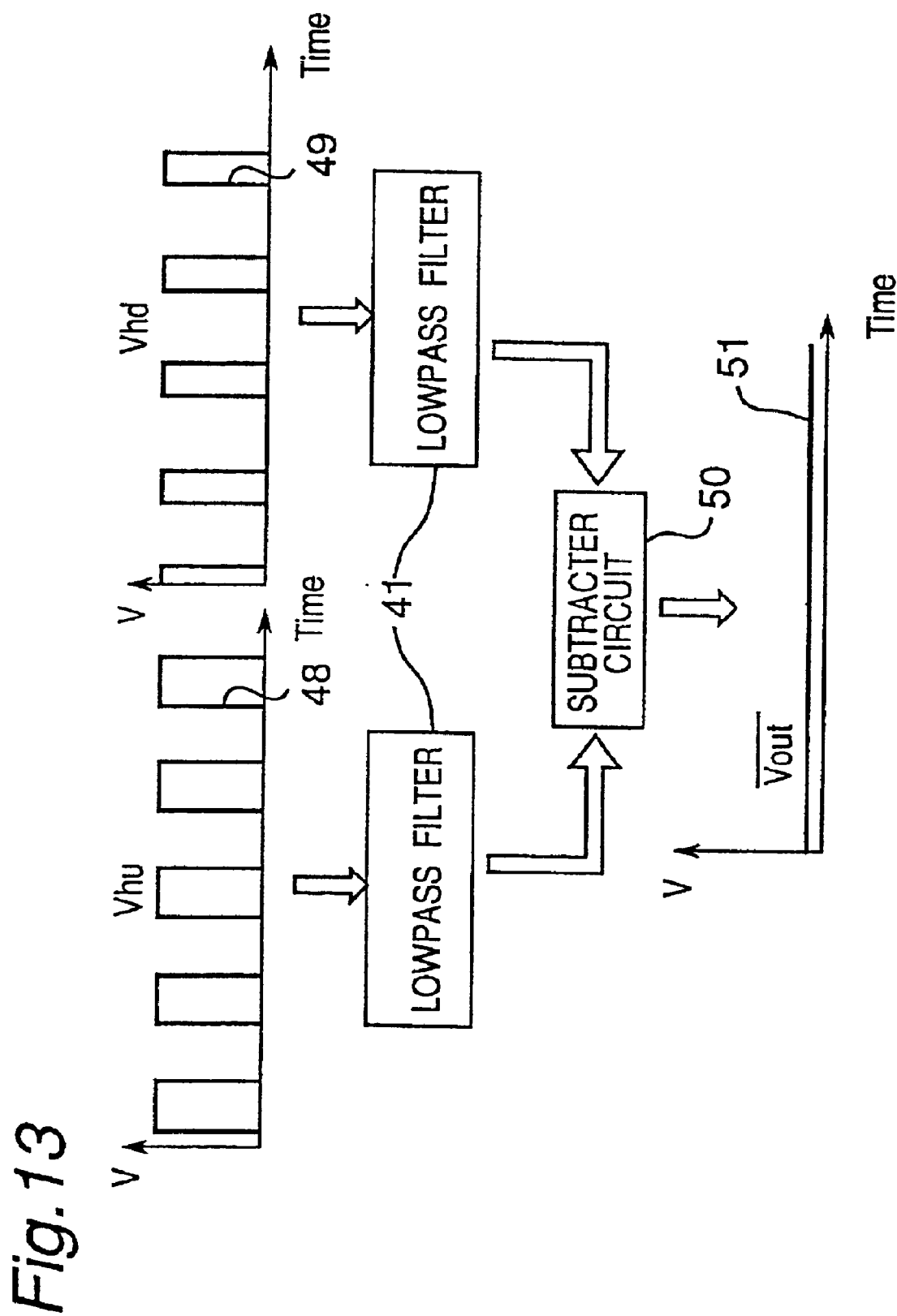
FIG. 13 is a diagram of a procedure of releasing a duty ratio difference.
Figure 14:
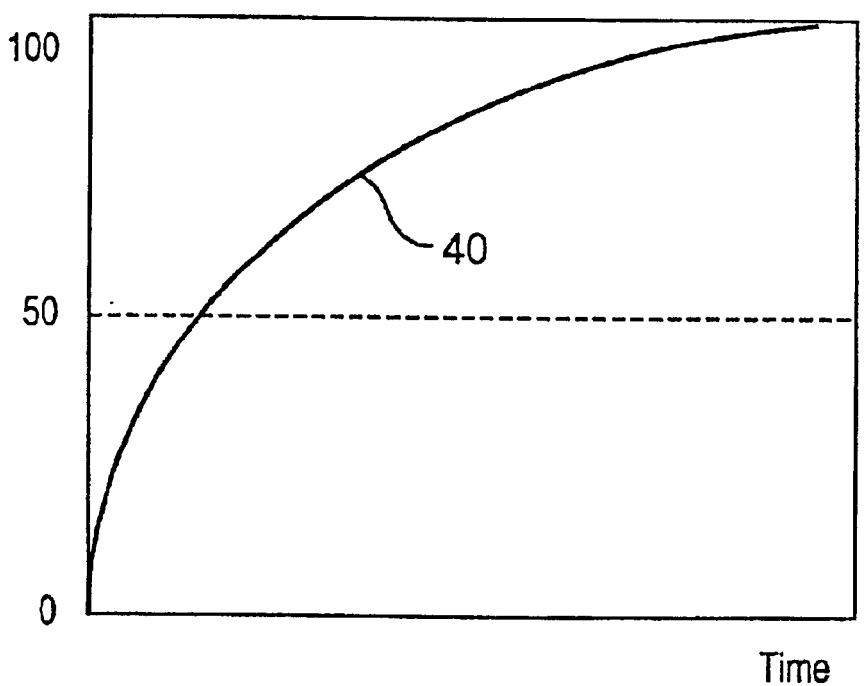
FIG. 14 is a graphic diagram of a profile 40 of the relationship between the flow and the duty ratio difference in Embodiment 5.

The duty ratio of t1(t1+t2) in Embodiment 3 may be replaced by a duty ratio difference (t1−t2)/(t1+t2). FIG. 13 illustrates a procedure of producing a duty ratio difference. The procedure starts with passing an output voltage 48 (Vhu) at the positive terminal 34 of the upstream heating resistor 28 (FIG. 8) and an output voltage 49 (Vhd) at the positive terminal 35 of the downstream heating resistor 29 (FIG. 8) through a couple of lowpass filters 41 to have two analog output voltages respectively. The analog output voltages are transferred to a subtracter circuit 50 where one of the two is subtracted by the other to develop an analog voltage 51 corresponding to a duty ratio difference (t1−t2)/(t1+t2). FIG. 14 illustrates a profile 40 representing the relationship between the flow and the duty ratio difference in the arrangement of Embodiment 5. The duty ratio difference (t1−t2)/(t1+t2) depends on the flow as denoted by the curve 40 in FIG. 14. As a result, the output voltage 51 released from the arrangement shown in FIG. 13 can have a flow-dependent profile equal to the curve 40.

While the arrangement of this embodiment offers the same effect as of Embodiment 3, its offset output (the output at zero of the flow) can be minimized to zero thus improving the sensitivity of the apparatus.

Embodiment 6

Figure 15:
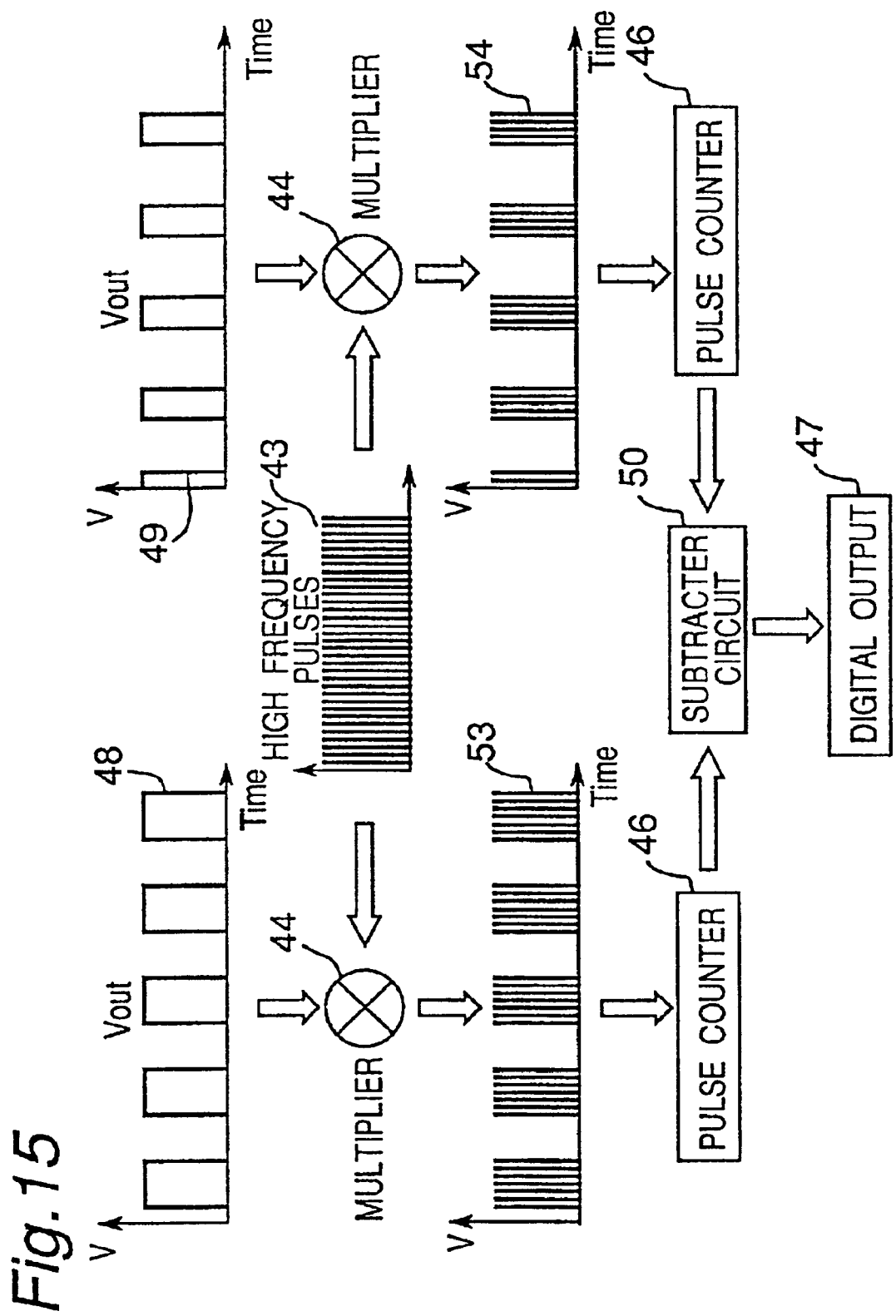
FIG. 15 is a diagram of a procedure of producing a digital output from a voltage 48 (Vhu) at the positive terminal 34 of an upstream heating resistor 28 (FIG. 8) and a voltage 49 (Vhd) at the positive terminal 35 of a downstream heating resistor 29 (FIG. 8)

FIG. 15 illustrates a procedure of producing a digital output from a voltage 48 (Vhu) at the positive terminal 34 of the upstream heating resistor 28 (FIG. 8) and a voltage 49 (Vhd) at the positive terminal 35 of the downstream heating resistor 29 (FIG. 8). The two output voltages 48 and 49 are multiplied by a high frequency pulse signal 43 in their corresponding multipliers 44. As a result, a couple of high frequency pulse trains 53 and 54 are preserved when the output voltages 48 and 49 are at their high level respectively. The number of pulses for a specific period in each of the pulse trains 53 and 54 is calculated by a pulse counter 46. Two counter outputs are finally subjected to the subtraction of a subtracter 50 to have a digital output 47.

While the arrangement of this embodiment offers the same effect as of Embodiment 5, easier application to a CPU of a computer can be achieved.

In each of the circuitry arrangements of Embodiments 3, 4, 5, and 6, the upstream and the downstream temperature sensing resistors 5 and 6 are supplied with a constant current from a constant current source 13. The constant current source may be replaced by a constant voltage source with equal success.

Embodiment 7

Figure 16:
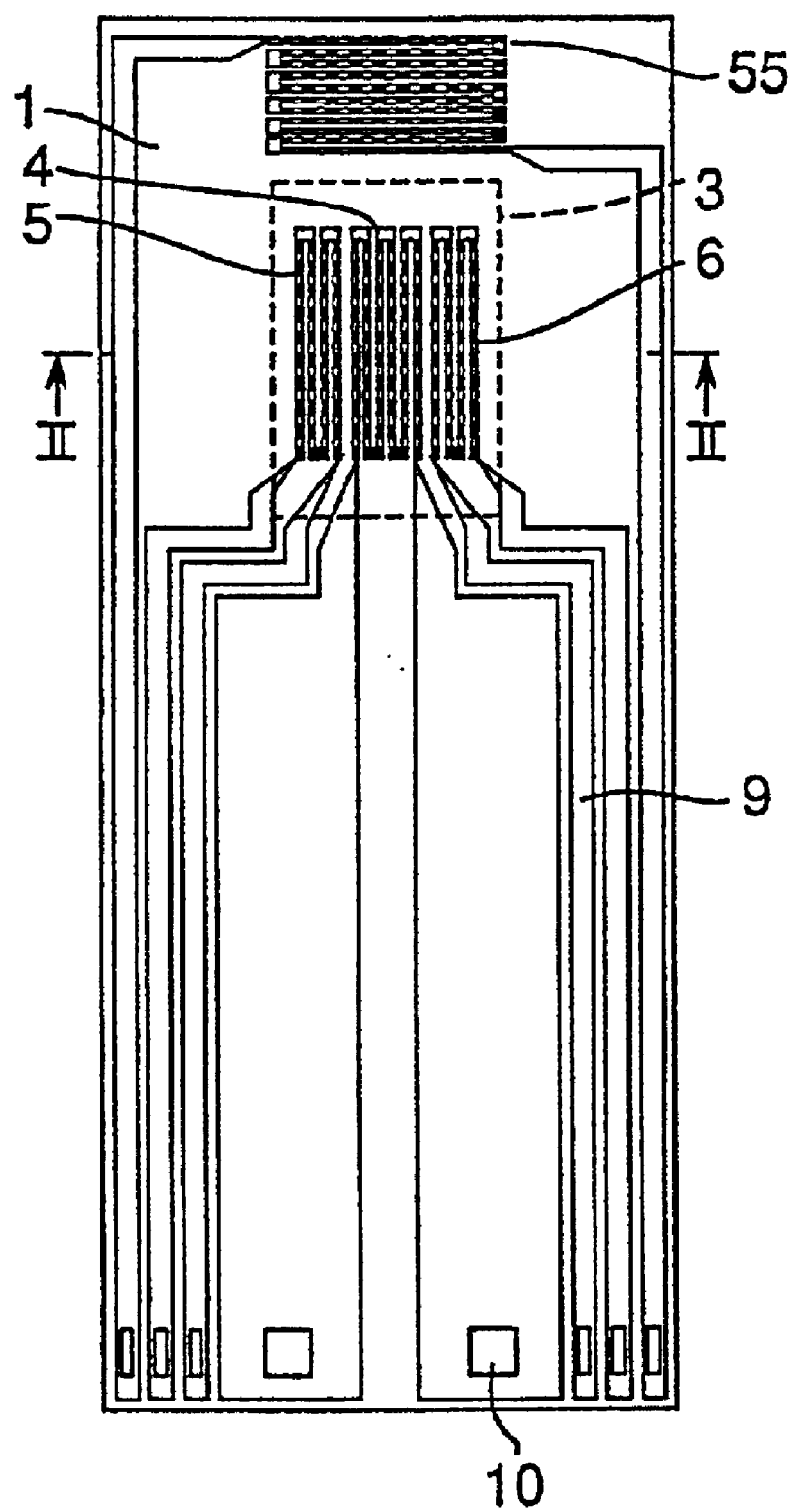
FIG. 16 is a view of a sensing section of a fluid flow measuring apparatus according to Embodiment 7.

FIG. 16 illustrates a sensing section of a fluid flow measuring apparatus according to Embodiment 7 of the present invention. The fluid flow measuring apparatus of Embodiment 7 has a fluid temperature sensing resistor 55 mounted on a silicon chip 1 thereof for sensing the temperature of fluid. The fluid temperature sensing resistor 55 is located as spaced from a thinned region 3 so that it hardly receive unwanted thermal effects from a heating resistor 4. The fluid temperature sensing resistor 55 may be mounted on a second thinned region of the silicon chip with its bottom side of silicon removed by etching.

Figure 17:
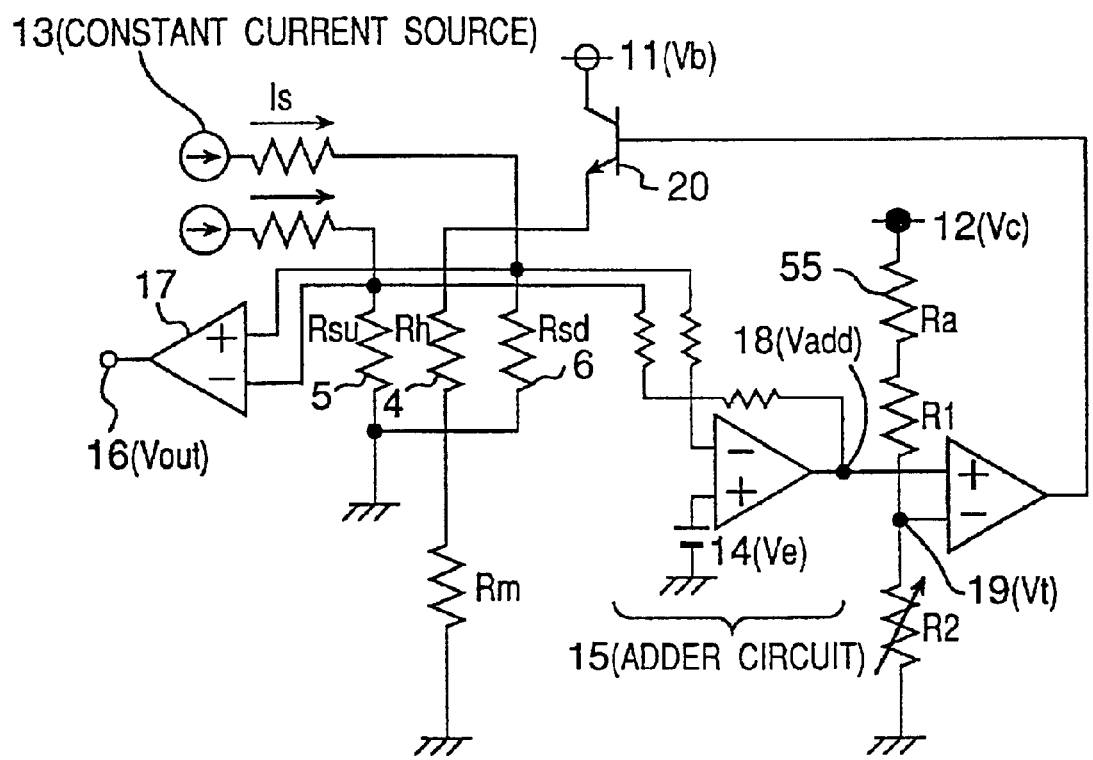
FIG. 17 is a circuit diagram of the fluid flow measuring apparatus with a fluid temperature sensing resistor 55 of Embodiment 7.

FIG. 17 is a circuit diagram of the fluid flow measuring apparatus with the fluid temperature sensing resistor 55 of Embodiment 7. A voltage 19 (Vt) provided in the circuit is expressed by:

$$Vt = \frac{R_2}{Ra + R_1 + R_2} Vc \qquad \text{(Equation 10)}$$

When Vadd of Equation 1 is equal to Vt of Equation 10, Equation 11 is established.

$$G(Vsu + Vsd) = Ve - \frac{R_2}{Ra + R_1 + R_2} Vc \qquad \text{(Equation 11)}$$

Assuming that the resistance and the resistance temperature factor of the fluid temperature sensing resistor 55 at 0° C. are Ra0 and αa respectively, the relationship with the fluid (and the resistor 55) having a temperature of Ta is expressed by:

$$Ra = R_{a0}(1 + \alpha_a Ta) \qquad \text{(Equation 12)}$$

Then, Equation 13 is established from Equation 11 and Equation 6, $$\frac{1}{2}(Tsu + Tsd) = \qquad \text{(Equation 13)}$$

$$\left[ Ve - \frac{R2}{R_{a0}(1 + \alpha_a Ta) + R1 + R2} Vc - 2GR_{s0}Is \right] \bigg/ 2G\alpha_s Is$$

As the right side of Equation 13 includes the temperature Ta of the fluid temperature sensing resistor 55, its result depends on the value Ta. This causes the average of the temperature level (Tsu) of the upstream temperature sensing resistor 5 and the temperature level (Tsd) of the downstream temperature sensing resistor 6 to be determined corresponding to the fluid temperature Ta. Accordingly, the higher the fluid temperature Ta becomes, the higher the average of the temperature levels of the upstream and the downstream temperature sensing resistors 5 and 6 is increased. The lower the fluid temperature Ta becomes, the lower the average of the temperature levels of the upstream and the downstream temperature sensing resistors 5 and 6 is decreased. The relationship between the fluid temperature Ta and the average of the temperature levels of the upstream and the downstream temperature sensing resistors 5 and 6 can be determined by adjusting the circuit constants R1 and R2 in Equation 13.

The arrangement of this embodiment enables to compensate a change in its response characteristics derived from a change in the temperature of the fluid and its temperature related properties can be improved.

Embodiment 8

In Embodiment 7, the fluid temperature sensing resistor 55 (Ra) is connected in series with the resistors R1 and R2 so that the voltage 19 (Vt) can be varied depending on the fluid temperature. However, the same effect can be obtained even if the voltage Ve is varied by the effect of the fluid temperature as understood from Equation 13. The apparatus may have an arrangement shown in FIG. 18.

Figure 18:
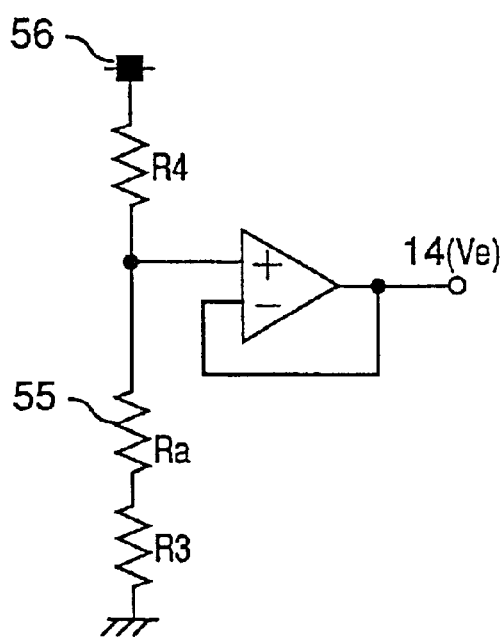
FIG. 18 is a circuit diagram for producing voltage Ve according to Embodiment 8.

FIG. 18 is a circuit diagram of Embodiment 8 for outputting voltage Ve. In the circuit, the voltage Ve is produced by dividing the voltage of a constant voltage source 56 with the use of fixed resistors (R3 and R4) and the fluid temperature sensing resistor 55. A change in the fluid temperature is measured by the fluid temperature sensing resistor 55. The voltage Ve is thus varied as the fluid temperature changes. Accordingly, the average of the temperature level (Tsu) of the upstream temperature sensing resistor 5 (FIG. 17) and the temperature level (Tsd) of the downstream temperature sensing resistor 6 (FIG. 17) can be modified in response to a change in the fluid temperature Ta. The relationship between the fluid temperature Ta and the average of the temperature levels of the upstream and the downstream temperature sensing resistors 5 and 6 can be adjusted using the fixed resistors R3 and R4 shown in FIG. 18.

The arrangement of this embodiment enables to compensate a change in the response characteristics caused by a change in the fluid temperature and its temperature related properties can be improved.

Embodiment 9

As described with Embodiment 8, the fluid temperature sensing resistor is used for compensating a change in the response characteristics derived from the fluid temperature change.

Figure 19:
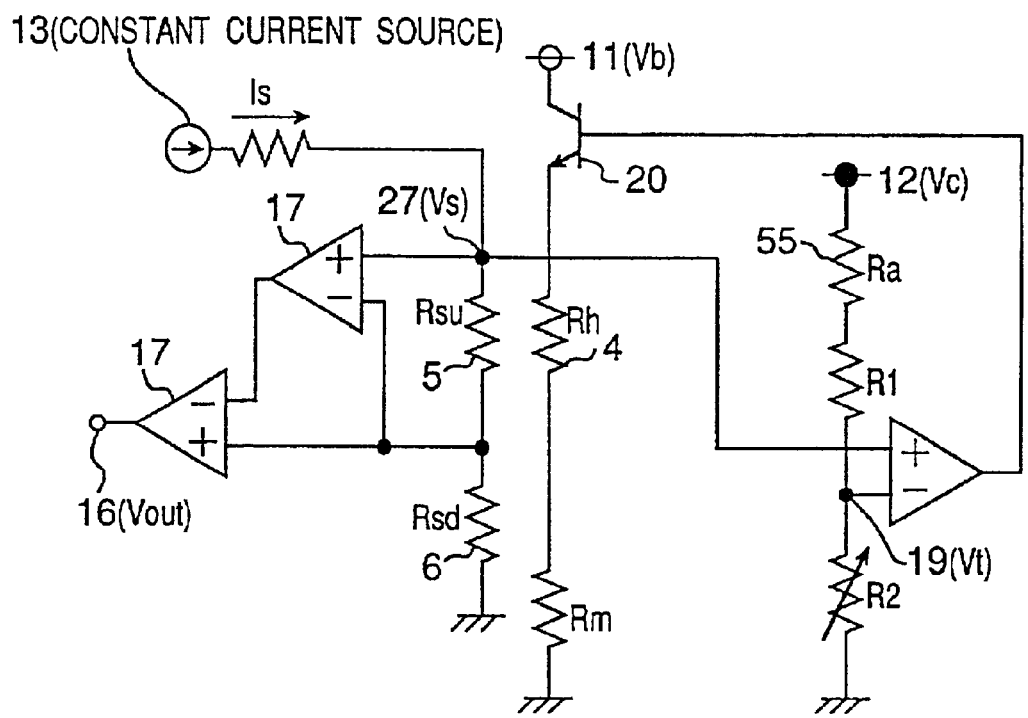
FIG. 19 is a circuit diagram of a fluid flow measuring apparatus with a fluid temperature sensing resistor 55 provided according to Embodiment 9.

FIG. 19 is a circuit diagram of a fluid flow measuring apparatus with the fluid temperature sensing resistor 55 according to Embodiment 9 of the present invention.

Needless to say, using the circuitry arrangements shown in FIGS. 17, 18, and 19, each of Embodiments 3, 4, 5, and 6 enables to compensate a change in the response characteristics derived from the fluid temperature change and its temperature related properties can be improved.

Embodiment 10

Figure 20:
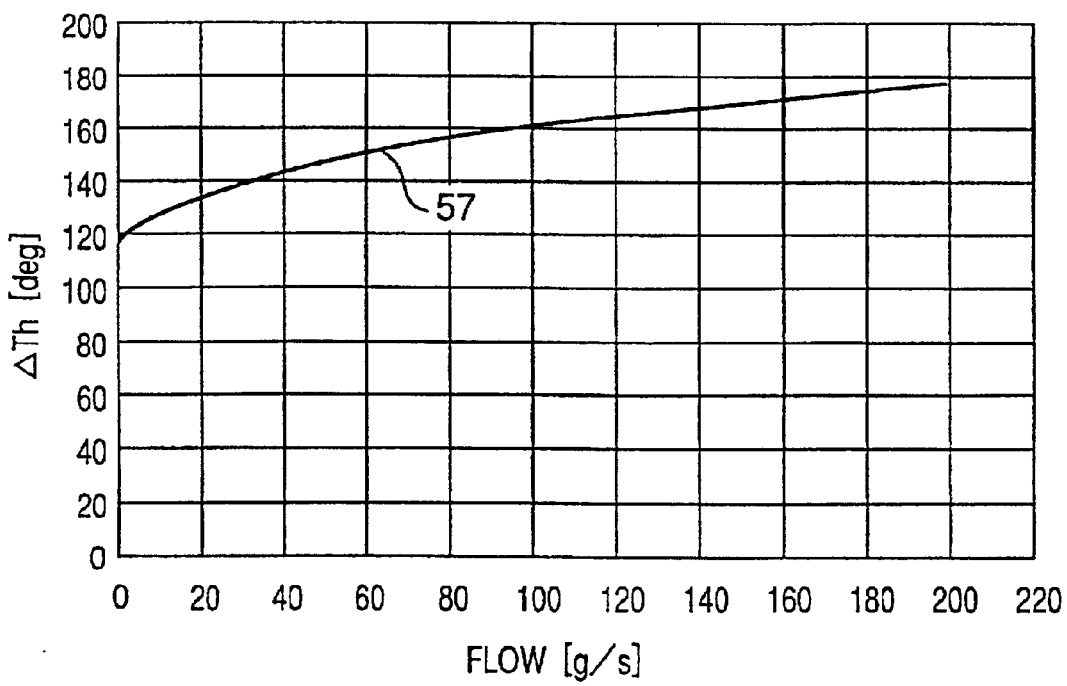
FIG. 20 is a graphic diagram of the relationship between the temperature difference ΔTh and the flow of fluid.

Assuming that the dependency on the flow of the temperature difference ($\Delta Ts=Tsu-Tsd$) between the upstream temperature sensing resistor 5 and the downstream temperature sensing resistor 6 in Embodiment 1 is expressed by the curve 25 shown in FIG. 5. It is also assumed that the difference between the temperature (Th) of the central heating resistor 4 and the temperature (Ta) of the fluid is $\Delta Th$ (=Th−Ta). The relationship between the temperature difference $\Delta Th$ and the flow is thus expressed by the curve 57 shown in FIG. 20. More particularly, the relationship between $\Delta Th$ and the flow is illustrated in FIG. 20 as has been proved through a series of experiments.

$$\Delta Ts = k(Q) \times \Delta Th \quad \text{(Equation 14)}$$

where $k(Q)$ is a coefficient which depends on the flow. As apparent from Equation 14, the temperature difference $\Delta Ts$ between the two resistors 5 and 6 can be varied by controlling $\Delta Th$.

Figure 21:
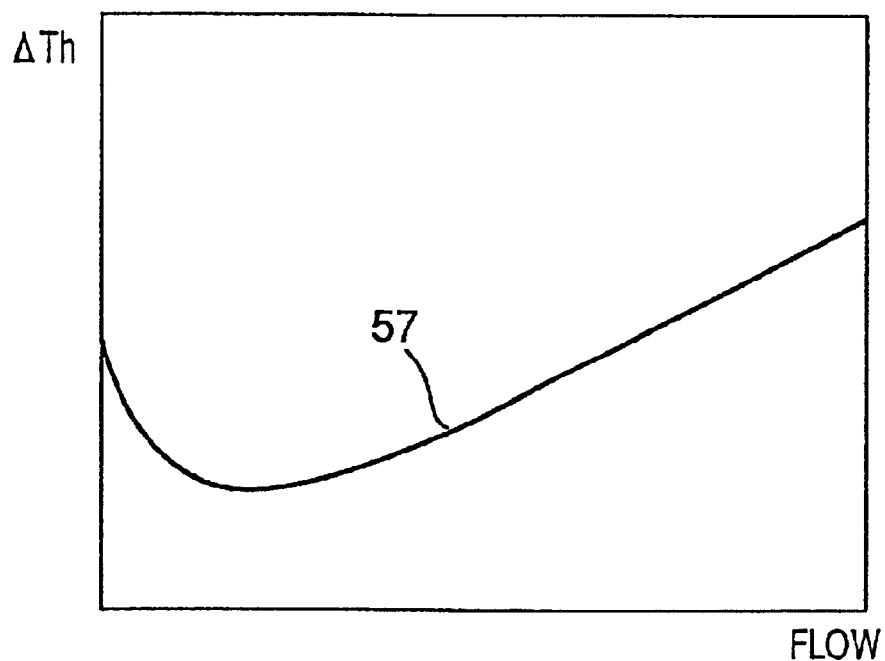
FIG. 21 is a graphic diagram of a profile 57 of the temperature difference ΔTh in relation to the flow.
Figure 22:
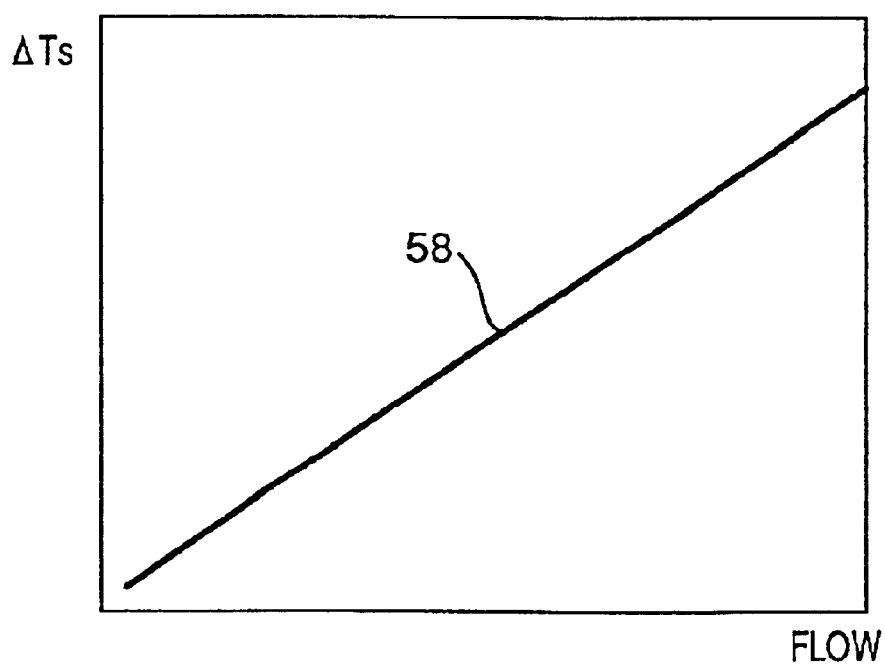
FIG. 22 is a graphic diagram of a linear profile 58 of the temperature difference ΔTs between two resistors 5 and 6 based on the temperature difference ΔTh between the fluid and the resistor 4 shown in FIG. 21.

Embodiment 10 allows the temperature difference $\Delta Th$ between the resistor 4 and the fluid to be modified in response to the flow. FIG. 21 illustrates a profile 57 of the temperature difference $\Delta Th$ changing with the flow. $\Delta Ts$ becomes linear when $\Delta Th$ is modified as shown. FIG. 22 illustrates a linear profile 58 of the temperature difference $\Delta Ts$ between the two resistors 5 and 6 determined from the temperature difference $\Delta Th$ between the resistor 4 and the flow shown in FIG. 21. As apparent from Equation 8, the output voltage Vout is proportional to $\Delta Ts$. Accordingly, when $\Delta Ts$ is linear, the output voltage Vout becomes linear to the flow.

Figure 23:
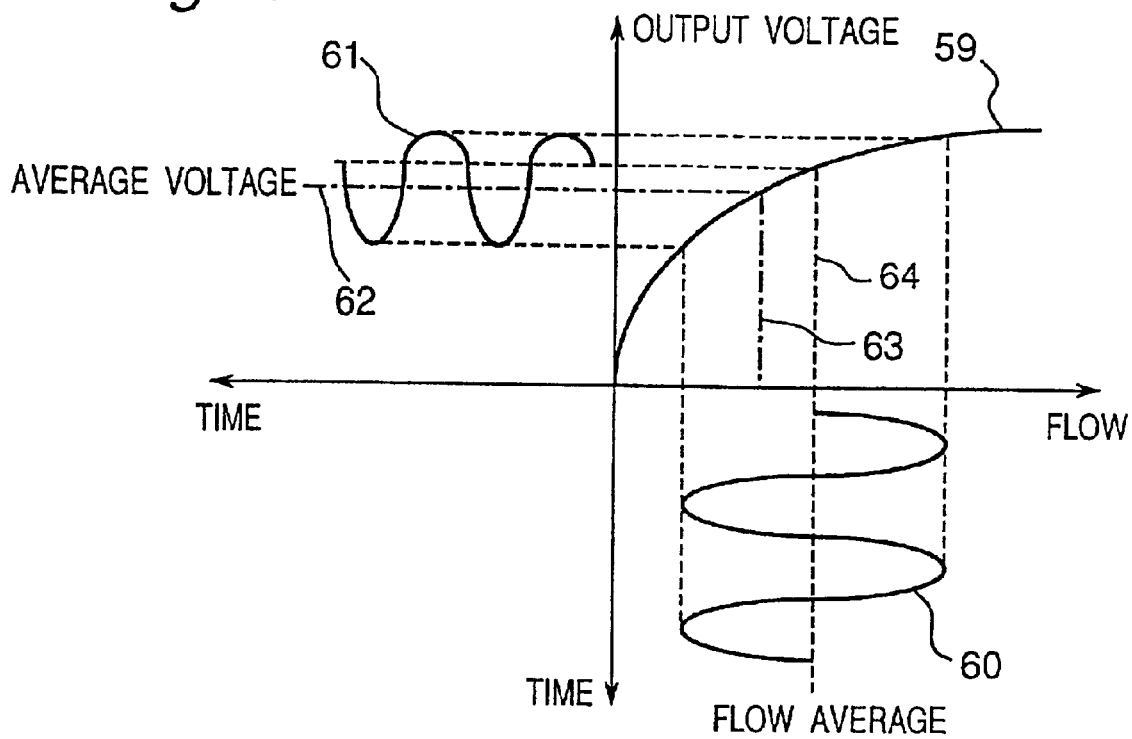
FIG. 23 is an explanatory view of a profile of pulsating flow.
Figure 24:
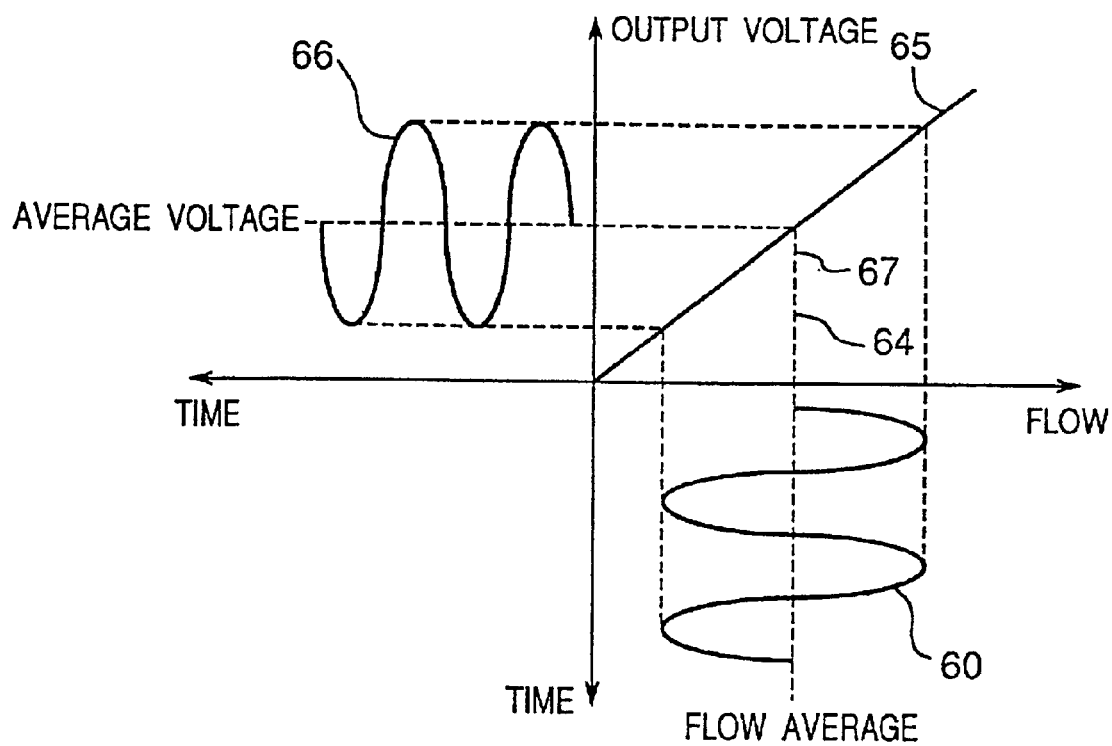
FIG. 24 is an explanatory view of another profile of pulsating flow.

As the output voltage is linear, pulsating flow characteristics will be improved. This is explained referring to FIGS. 23 and 24. FIGS. 23 and 24 are explanatory views illustrating the response to pulsating flows. The pulsating flow characteristics represents how precisely the flow of fluid can be measured when the flow is varied at a frequency. For example, a jet of air running through a conduit into the engine of an automobile may produce pulsating flows when the load is high. The operation of a conventional apparatus (where the output voltage is not linear) will first be described referring to FIG. 23. The curve 59 represents the relationship between the flow and the output voltage. A pulsating flow expressed in a time-flow relationship shown in curve 60 is converted into a waveform expressed in a time-voltage relationship denoted by 61. For controlling the motion of the automobile engine, the output may be averaged for a predetermined period. The average level of the waveform 61 corresponds to a voltage level denoted by dashed line 62. It is understood that, based on the conversion curve 59, average level 62 of the waveform 61 can be converted into dashed line 63 which is not identical to average 64 of the pulsating flow 60. The flow rate 63 is not identical to the average 64 of the pulsating flow 60. As described, the pulsating flow is converted into an output voltage through the non-linear flow/output relationship and an average of the output voltages is then translated into a flow rate. A resultant flow rate is however different from the actual average flow. This may result in an pulsating flow error.

When the relationship between the flow and the output voltage is linear as expressed by the curve 65 in FIG. 24, the pulsating flow 60 is converted into a waveform 66. As shown, an average 67 of the waveform 66 is identical to the average 64 of the pulsating flow 60. This generates no pulsating flow error.

In this embodiment, as the temperature of the heating resistor 4 is controlled depending on the flow so that the relationship between the flow and the output voltage is linear, pulsating flow characteristics can hence be improved. The arrangement of this embodiment may be applied to that of Embodiment 2 which thus provides the same effect as of this embodiment.

Embodiment 11

Figure 25:
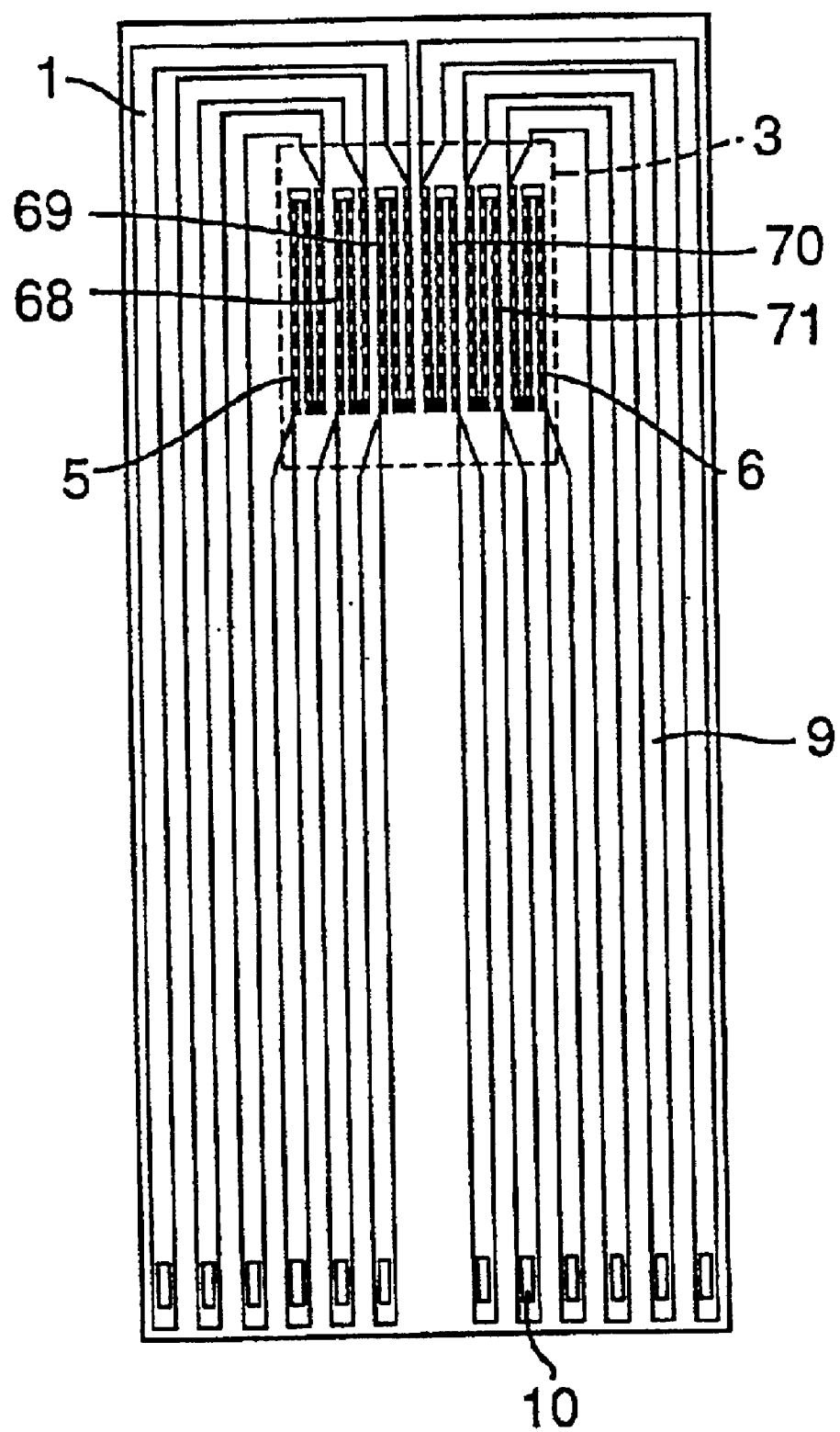
FIG. 25 is a view of a sensing section of a fluid flow measuring apparatus according to Embodiment 11.

FIG. 25 illustrates a sensing section of a fluid flow measuring apparatus according to Embodiment 11. The fluid flow measuring apparatus has six resistors mounted in the following order from the upstream on a thinned region 3 of a silicon substrate 1 thereof, i.e., an upstream temperature sensing resistor 5, a first heating resistor 68, a second heating resistor 69, a third heating resistor 70, a fourth heating resistor 71, and a downstream temperature sensing resistor 6. Although the temperature sensing resistor and the heating resistor are distinguished from each other by name, they may be identical elements as thermally sensitive resistors. In other words, the thermally sensitive resistor has two major thermal functions, sensing the temperature and generating the heat.

Figure 26:
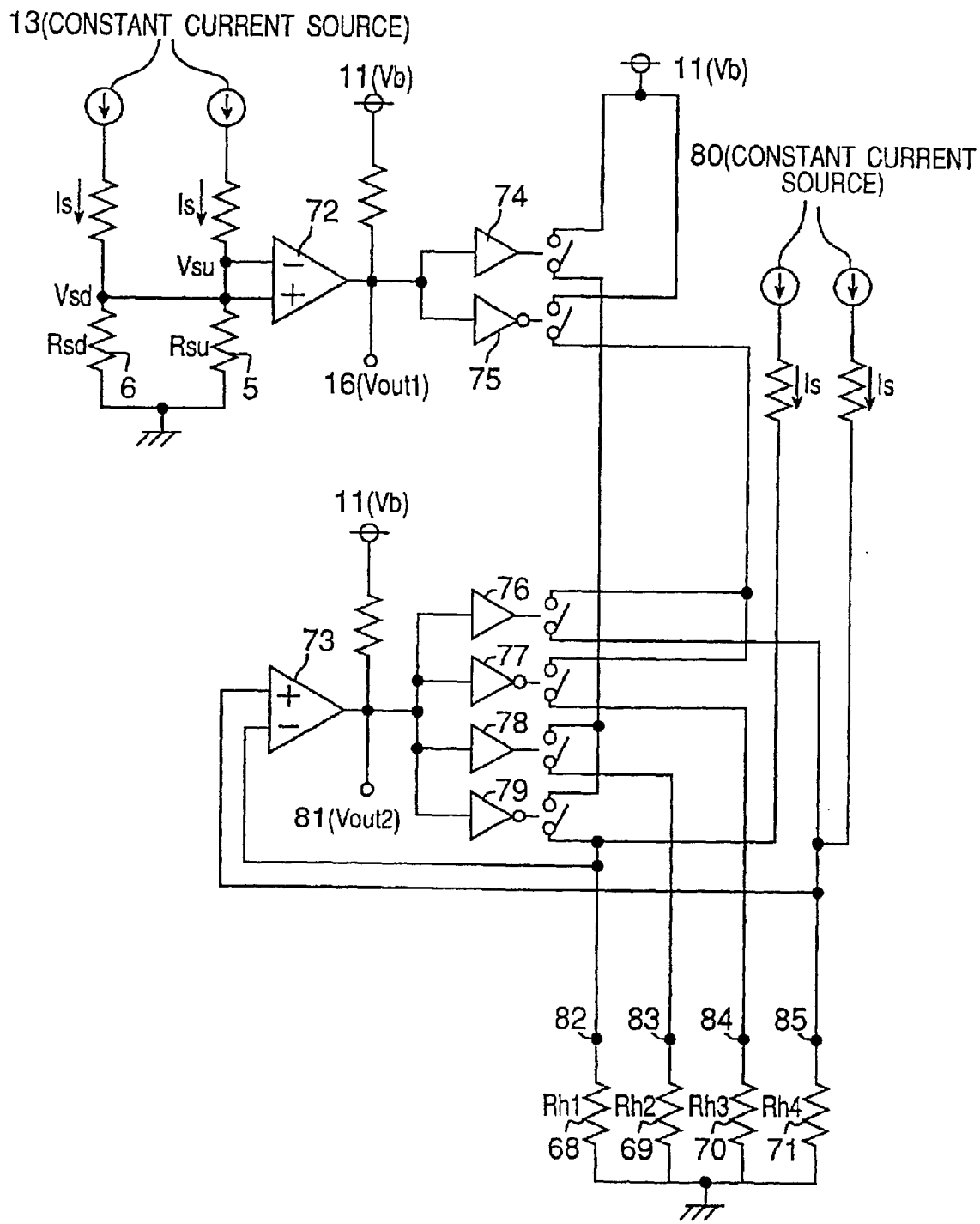
FIG. 26 is a circuit diagram of the fluid flow measuring apparatus with six resistors of Embodiment 11.

FIG. 26 is a circuit diagram of the fluid flow measuring apparatus with the six resistors of Embodiment 11. The upstream temperature sensing resistor 5 (Rsu) and the downstream temperature sensing resistor 6 (Rsd) are connected to a constant current source 13 which provides a constant current Is. A voltage (Vsu) across the upstream temperature sensing resistor 5 and a voltage (Vsd) across the downstream temperature sensing resistor 6 are received by the negative input terminal and the positive input terminal of a comparator 72 respectively. An output of the comparator 72 is at a high level when temperature of the upstream temperature sensing resistor 5 is smaller than the temperature of the downstream temperature sensing resistor 6 (namely Vsu<Vsd). The output is at a low level when vice versa (Vsu>Vsd). The output of the comparator 72 is transferred to a couple of switches 74 and 75.

The first heating resistor 68 and the fourth heating resistor 71 are connected to another constant current source 80 which provides a constant current Is. A terminal voltage 82 (Vh1) of the first heating resistor 68 and a terminal voltage 85 (Vh4) of the fourth heating resistor 71 are received by the negative input terminal and the positive input terminal of a comparator 73 respectively. An output of the comparator 73 is at a high level when the temperature of the first heating resistor 68 is lower than the temperature of the fourth heating resistor 71 (namely Vh1<Vh4). The output is at a low level when vice versa (Vh1>Vh4). The output of the comparator 73 is transferred to a group of switches 76, 77, 78, and 79. The switch 74 is connected at one end to the source 11 and at the other end to one end of the switch 78 and one end of the switch 79. The other end of the switch 78 is connected to the second heating resistor 69 and the other end of the switch 79 is connected to the first heating resistor 68. The switch 75 is connected at one end to the source 11 and at the other end to one end of the switch 76 and one end of the switch 77. The other end of the switch 76 is connected to the fourth heating resistor 71 and the other end of the switch 77 is connected to the third heating resistor 70. The outputs from an output terminal 16 of the comparator 72 and an output terminal 81 of the comparator 73 are output voltages of the apparatus.

The operation of the circuitry arrangement shown in FIG. 26 is now explained. When fluid flows from the upstream, the temperature of the upstream temperature sensing resistor 5 becomes lower than that of the downstream temperature sensing resistor 6 thus producing Vsu<Vsd of the output voltage relationship. This shifts the output of the comparator 72 to the high level hence turning the switch 74 on and switch 75 off. Simultaneously, the temperature of the first heating resistor 68 becomes lower than that of the fourth heating resistor 71, thus producing Vh1<Vh4 of the voltage relationship. This shifts the output of the comparator 73 to the high level thus turning the switches 76 and 78 on and the switches 77 and 79 off. As a result, the second heating resistor 69 is conducted to the source 11.

When the second heating resistor 69 is energized, it generates Joule heat hence heating up the first heating resistor 68 located in proximity of resistor 69. As the first heating resistor 68 is heated up, its temperature becomes higher than that of the fourth heating resistor 71 thus shifting the voltage relationship to Vh1>Vh4. This shifts the output of the comparator 73 to the low level, thus turning the switches 76 and 78 off and the switches 77 and 79 on. As a result, the first heating resistor 68 is conducted to the source 11.

When the first heating resistor 68 is energized, it generates Joule heat hence heating up the upstream temperature sensing resistor 5 located in proximity of resistor 68

As the upstream temperature sensing resistor 5 is heated up, its temperature becomes higher than that of the downstream temperature sensing resistor 6 thus shifting the voltage relationship to Vsu>Vsd. This shifts the output of the comparator 72 to the low level, thus turning the switch 74 off and the switch 75 on. As a result, the third heating resistor 70 is conducted to the source 11 and energized.

Then, the third heating resistor 70 generates Joule heat hence heating up the fourth heating resistor 71 located in proximity of resistor 70. As the fourth heating resistor 71 is heated up, its temperature becomes higher than that of the first heating resistor 68 thus shifting the voltage relationship to Vh1<Vh4. This shifts the output of the comparator 73 to the high level, thus turning the switches 77 and 79 off and the switches 76 and 78 on. As a result, the fourth heating resistor 71 is conducted to the source 11 and energized.

The fourth heating resistor 71 generates Joule heat hence heating up the downstream temperature sensing resistor 6 located in proximity of resistor 71. As the downstream temperature sensing resistor 6 is heated up, its temperature becomes higher than that of the upstream temperature sensing resistor 5 thus shifting the voltage relationship to Vsu<Vsd. This shifts the output of the comparator 72 to the high level, thus turning the switch 75 off and the switch 74 on. As a result, the apparatus is returned back to its initial state.

By the operation of the switches 74, 75, 76, 77, 78, and 79, the source 11 is repeatedly switched in a sequence for connection with the four heating resistors from the first to the fourth heating resistor so as to make the two temperature levels of the upstream temperature sensing resistor 5 and the downstream temperature sensing resistor 6 equal to each other and the two temperature levels of the first heating resistor 68 and the fourth heating resistor 71 equal to each other.

FIG. 27 illustrates the relationship between the terminal voltages of the resistors 68 to 71 (FIG. 26) and the output voltages of the output terminals 16 and 81 (FIG. 26). In the diagram, a chain of pulses 86 represents the first output voltage 16 (Vout1) and a chain of pulses 87 represent the second output voltage 81 (Vout2). A chain of pulses 88, a chain of pulses 89, a chain of pulses 90, and a chain of pulses 91 are the voltage (Vh2) across the second heating resistor 69, the voltage (Vh1) across the first heating resistor 68, the voltage (Vh3) across the third heating resistor 70, and the voltage (Vh4) across the fourth heating resistor 71 respectively. As apparent from the timing shown in FIG. 27, when both the pulse signals 86 (Vout1) and 87 (Vout2) are at the high level, the pulse signal 88 (Vh2) is turned to the high level. Then, the other signals Vh1, Vh3, and Vh4 are turned to the high level in a sequence before Vh2 becomes at the high level again. FIG. 28 illustrates the relationship between the signals Vout1, Vout2, Vh1, Vh2, Vh3, and Vh4.

When fluid flows from the upstream, the duration when the temperature of the upstream temperature sensing resistor 5 is lower than that of the downstream temperature sensing resistor 6 becomes longer. Accordingly, the duration t1 when the output of the comparator 72 stays at the high level is longer than the duration t2 when the same stays at the low level. As the duration when the temperature of the first heating resistor 68 is lower than that of the fourth heating resistor 71 becomes longer, the duration t3 when the output of the comparator 73 stays at the high level is longer than the duration t4 when the same stays at the low level. The greater the flow of the fluid becomes, the higher the difference (or the ratio) can be increased. When the fluid flows in an opposite direction, the relationship is inverted.

Figure 29:
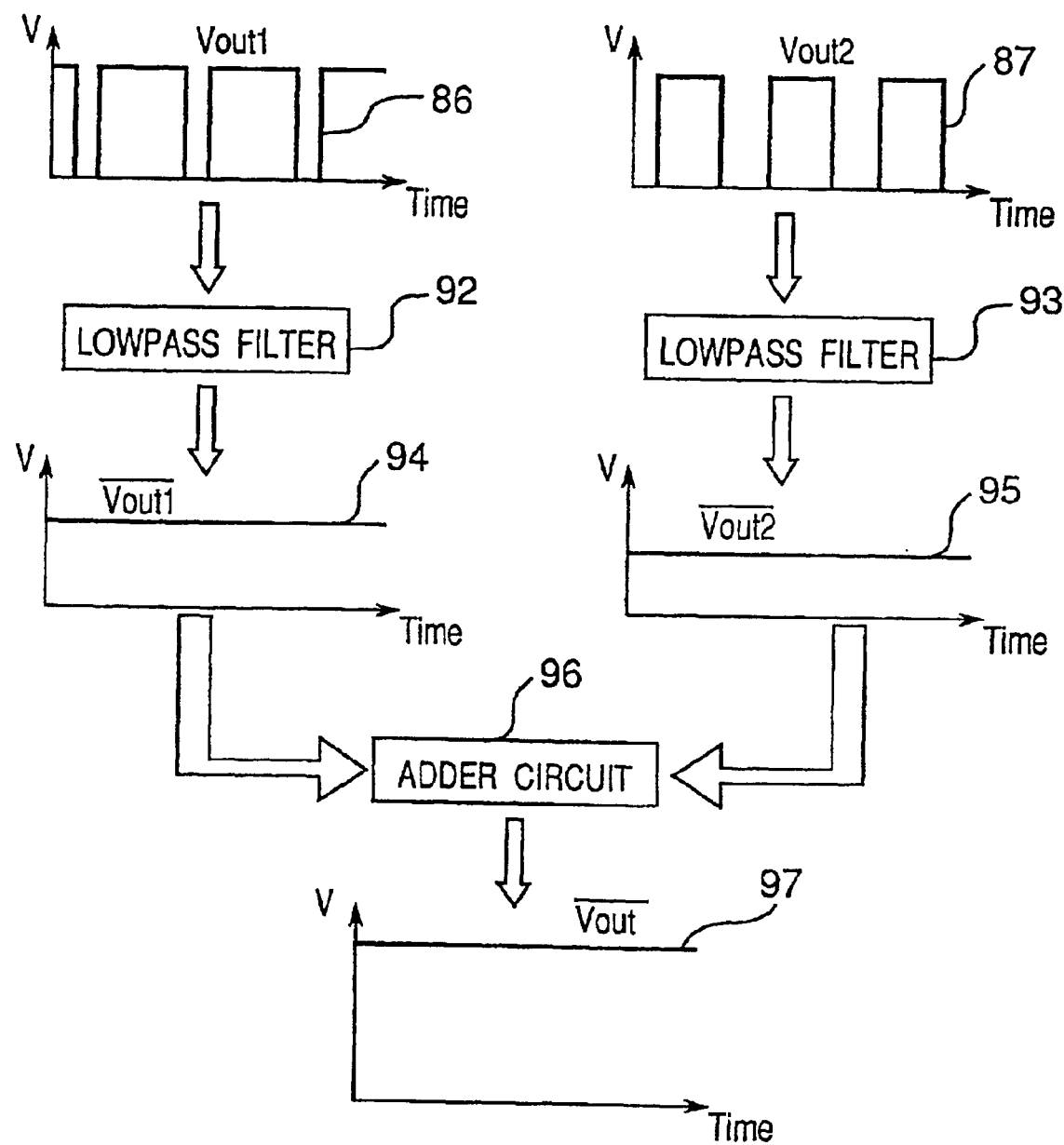
FIG. 29 is a diagram of a procedure of producing a final output.

As shown in FIG. 29, the output voltages 86 (Vout1) and 87 (Vout2) are converted, by a pair of lowpass filters 92 and 93, into analog forms 94 and 95 respectively. The analog output voltages 94 and 95 are obtained according to the duty ratios t1/(t1+t2) and t3/(t3+t4) of the output voltages 86 and 87 respectively. The analog output voltages 94 and 95 are then summed by an adder circuit 96 to calculate a final output voltage 97. The flow of the fluid can be determined from the output voltage 97.

Figure 30:
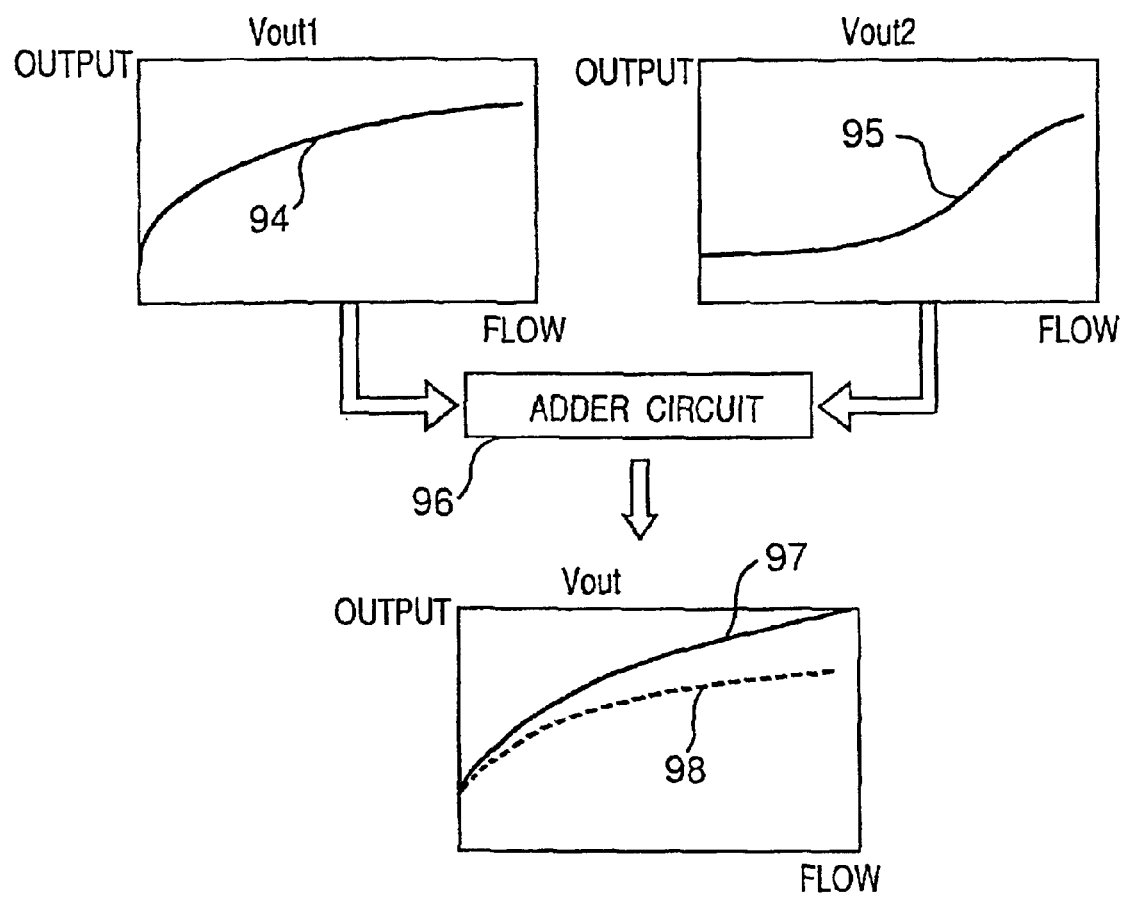
FIG. 30 is a graphic diagram of the final output voltage 97 produced from two output voltages 94 and 95.

FIG. 30 illustrates a graphic profile of the final output voltage 97 calculated from the two analog output voltages 94 and 95. The output voltage 94 (Vout1) obtained based on the temperature relationship between the upstream temperature sensing resistor 5 and the downstream temperature sensing resistor 6 may largely be varied at a smaller range of the flow quantity as compared with the output voltage 95 (Vout2) obtained based on the temperature relationship between the first heating resistor 68 and the fourth heating resistor 71. At a greater range of the flow quantity, the output voltage 95 (Vout2) will largely be varied while the output voltage 94 (Vout1) becomes saturated. This happens because the upstream temperature sensing resistor 5 and the downstream temperature sensing resistor 6 are located as spaced from a high-temperature area (i.e. the center area) of the thinned region 3 and hence become more susceptible to a change in the temperature at a smaller range of the flow quantity. In addition, the first and the fourth heating resistors 68 and 71 are located close to the high temperature area and susceptible to a change in the temperature at a higher range of the flow quantity. As the two output voltages are summed, the resultant output voltage 97 can be sensitive at both the lower and higher ranges of the flow quantity. For comparison, the output voltage 98 of a conventional apparatus is denoted by the dotted line.

This embodiment allows two output voltages which are sensitive at a lower range and a higher range of the flow quantity respectively to be summed. Accordingly, the apparatus produces a favorable output which is sensitive throughout a wider range of the flow quantity and its dynamic range can be increased. As the temperature measurements of the upstream temperature sensing resistor 5, the downstream temperature sensing resistor 6, the first heating resistor 68, and the fourth heating resistor 71 are subjected to feed-back controlling, the apparatus can be improved in the response as compared with a conventional apparatus with open-loop system.

Embodiment 12

Figure 31:
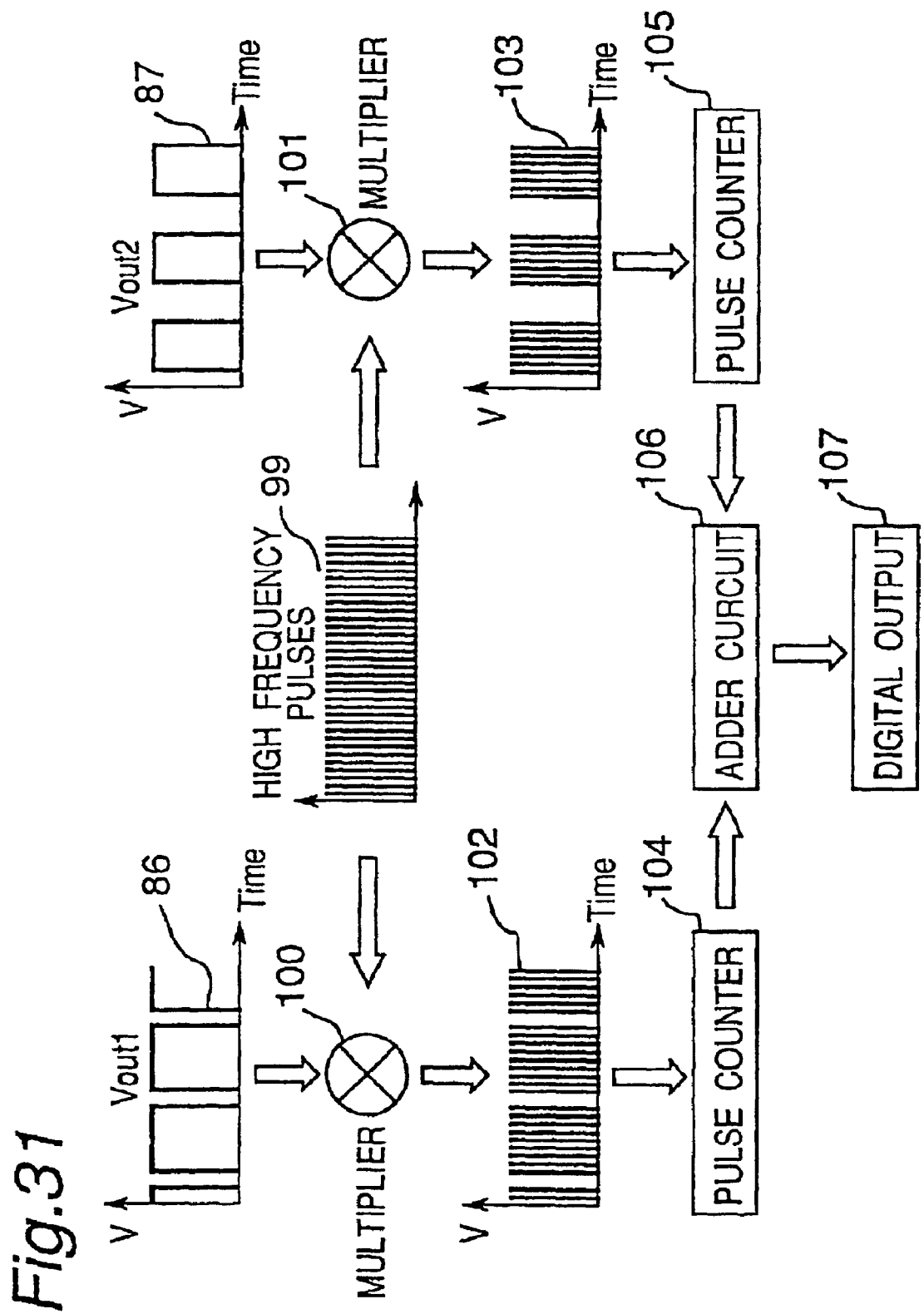
FIG. 31 is a diagram of a procedure of producing a digital output from the two output voltages 86 (Vout1) and 87 (Vout2) shown in FIG. 29.

FIG. 31 illustrates a procedure of producing a digital output from the output voltages 86 (Vout1) and 87 (Vout2) described using FIG. 29. The two output voltages 86 and 87 are multiplied by a high frequency pulse signal 99 in a pair of multipliers 100 and 101 respectively. As a result, pulses of the high frequency pulse signal are extracted to develop high frequency pulse signals 102 and 103 respectively when the output voltages 86 and 87 are at a high level (during t1 and t3 in FIG. 27). The number of pulses of each of the two high frequency pulse signals 102 and 103 is counted for a given period by a pulse counter 104 or 105. The count outputs of the two pulse counters 104 and 105 are then summed by an adder circuit 106 to have a single digital output 107.

Accordingly, the arrangement of this embodiment can provide the same advantage as of Embodiment 11 and easier application to a CPU of a computer can be achieved.

Embodiment 13

The duty ratios t1/(t1+t2) and t3(t3+t4) in Embodiment 11 may be replaced by duty ratio differences (t1−t2)/(t1+t2) and (t3−t4)/(t3+t4).

Figure 32:
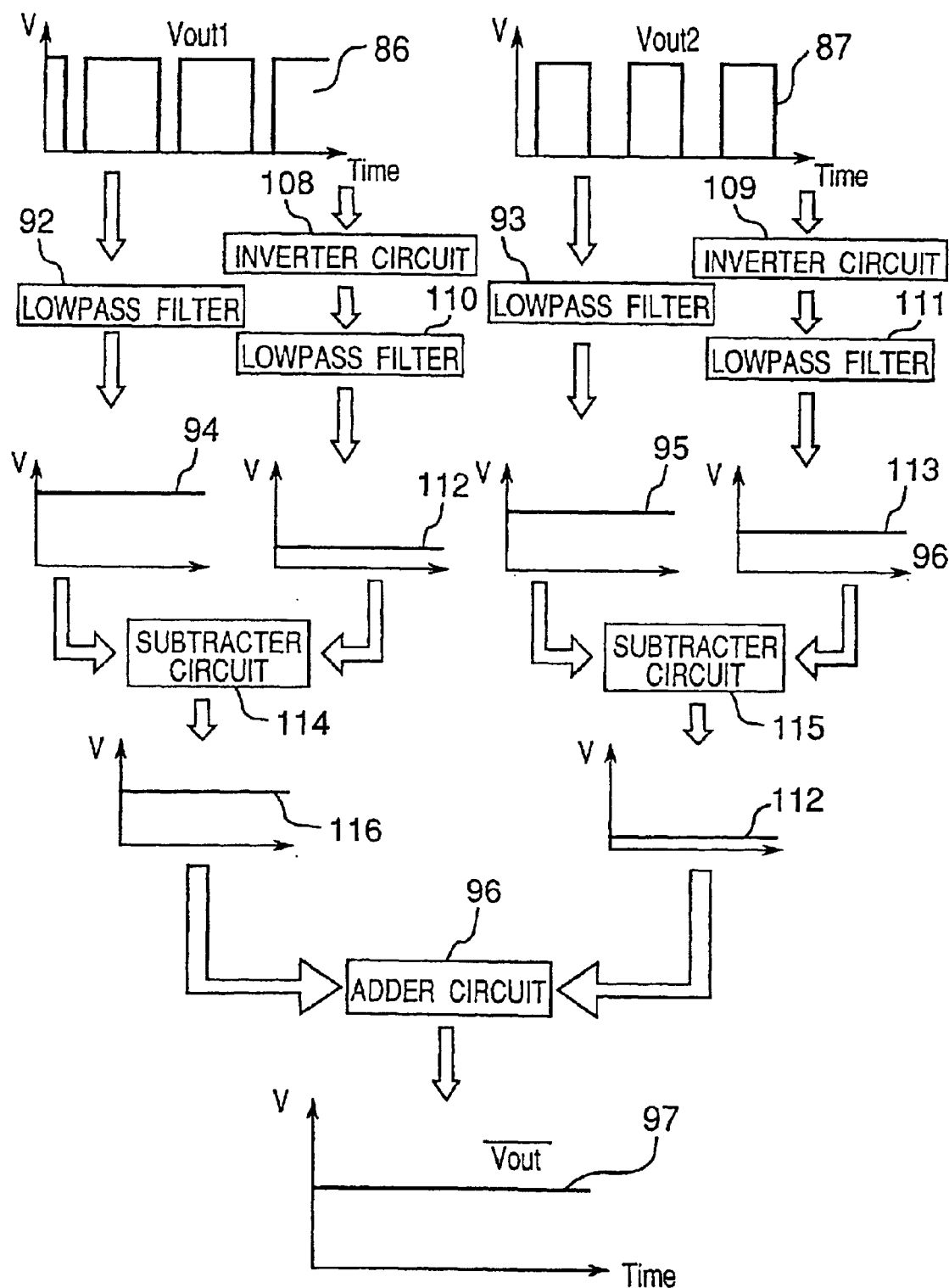
FIG. 32 is a diagram of a procedure of producing a duty ratio difference.

FIG. 32 illustrates a procedure of producing a duty ratio difference. The procedure starts with the output voltage 86 (Vout1) subjected to the filtering operation of a lowpass filter 92 to have an analog output voltage 94. The output voltage 86 (Vout1) is inverted by an inverter circuit 108 and passed through a lowpass filter 110 to have an analog output voltage 112. The two analog output voltages 94 and 112 are subjected to the subtracting operation of a subtracter circuit 114 to obtain an analog output voltage 116 according to the duty ratio difference (t1−t2)/(t1+t2).

Similarly, the output voltage 87 (Vout2) is subjected to the filtering operation of a lowpass filter 93 to have an analog output voltage 95. The output voltage 87 (Vout2) is inverted by an inverter circuit 109 and passed through a lowpass filter 111 to have an analog output voltage 113. The two analog output voltages 95 and 113 are subjected to the subtracting operation of a subtracter circuit 115 to develop an analog output voltage 117 according to the duty ratio difference (t3−t4)/(t3+t4).

The two analog outputs 116 and 117 are then transferred to an adder circuit 96 where they are summed to have a final output voltage 97.

Accordingly, the arrangement of this embodiment can provide the same advantage as of Embodiment 11 while its output when the flow is zero (referred to as offset output) is nil hence enhancing the sensitivity.

Embodiment 14

Figure 33:
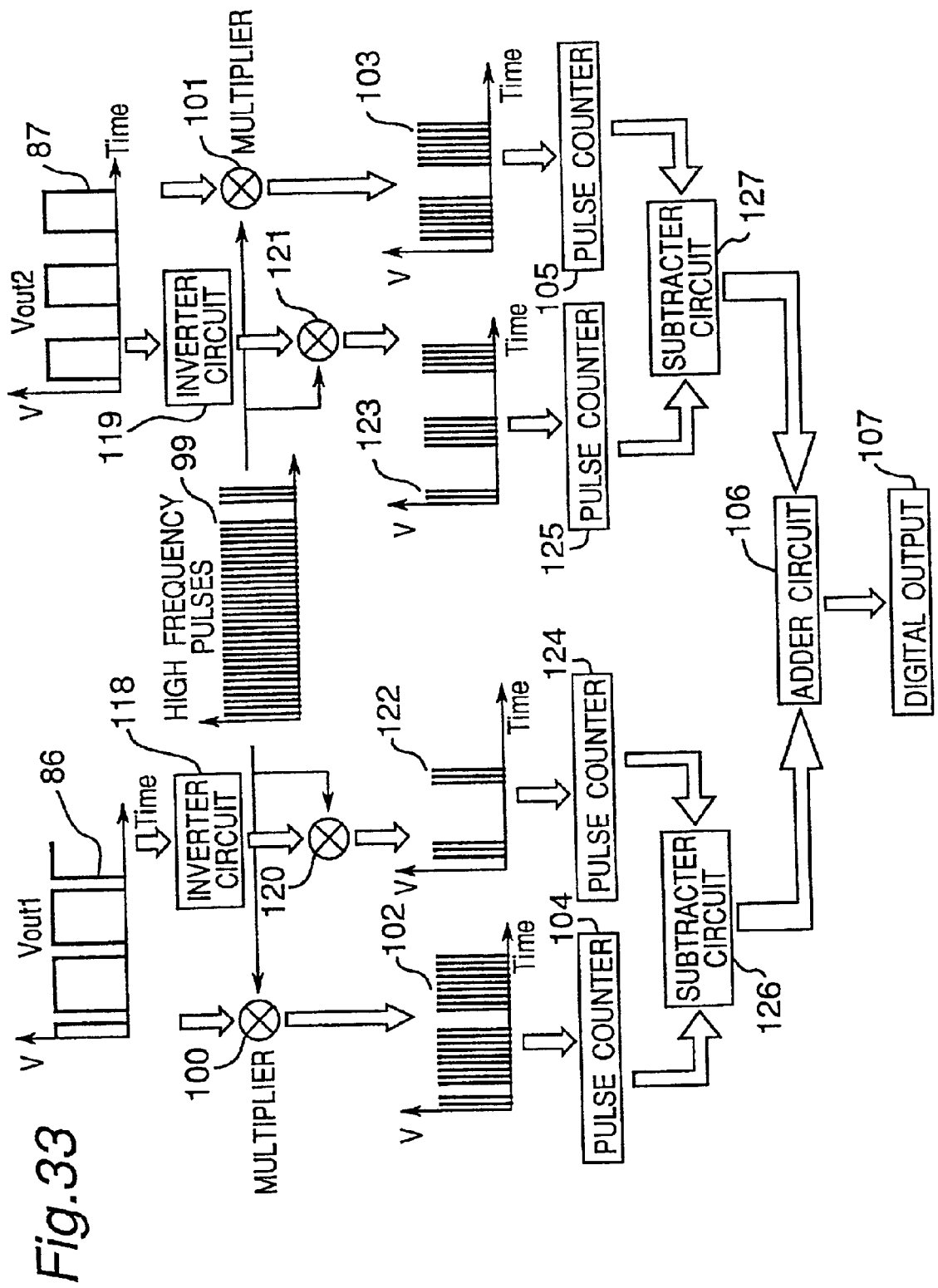
FIG. 33 is a diagram of another procedure of producing a digital output from the two output voltages 86 (Vout1) and 87 (Vout2) shown in FIG. 29.

FIG. 33 illustrates another procedure of producing a digital output from the two output voltages 86 (Vout1) and 87 (Vout2) illustrated in FIG. 29.

The output voltage 86 (Vout1) is multiplied by a high frequency pulse signal 99 in a multiplier 100. As a result, pulses of the high frequency pulse signal 102 are extracted to obtain a high frequency pulse signal 102 when the output voltage 86 is at a high level. The number of pulses of the high frequency pulse signal 102 is counted for a given period by a pulse counter 104. The output voltage 86 (Vout1) is inverted by an inverter circuit 118 and multiplied by the high frequency pulse signal 99 in a multiplier 120. As a result, pulses of the high frequency pulse signal are extracted to obtain a high frequency pulse signal 122 when the inverted output voltage is at a high level. The number of pulses of the high frequency pulse signal 122 for the period is counted by a pulse counter 124. The two count outputs are then subjected to the subtracting operation of a subtracter circuit 126.

Similarly, the output voltage 87 (Vout2) is multiplied by the high frequency pulse signal 99 in a multiplier 101. As a result, pulses of the high frequency pulse signal are extracted to obtain a high frequency pulse signal 103 when the output voltage 87 is at a high level. The number of pulses of the high frequency pulse signal 103 is counted for the period by a pulse counter 105. The output voltage 87 (Vout2) is inverted by an inverter circuit 119 and multiplied by the high frequency pulse signal 99 in a multiplier 121. As a result, pulses of the high frequency pulse signal are extracted to obtain a high frequency pulse signal 123 when the inverted output voltage is at a high level. The number of pulses of the high frequency pulse signal 123 is counted for the period by a pulse counter 125. The two count outputs are then subjected to the subtracting operation of a subtracter circuit 127.

The two resultant subtraction outputs are summed by an adder circuit 106 to have a final digital output 107.

Accordingly, the arrangement of this embodiment can provide the same advantage as of Embodiment 13 and easier application to a CPU of a computer can be achieved.

Each of the circuitry arrangements of Embodiments 11, 12, 13, and 14 employs two constant current sources 13 and 80 for feeding constant currents to the upstream temperature sensing resistor 5, the downstream temperature sensing resistor 6, the first heating resistor 68, and the fourth heating resistor 71. The constant current sources may be replaced by constant voltage sources with equal success.

Embodiment 15

Figure 34:
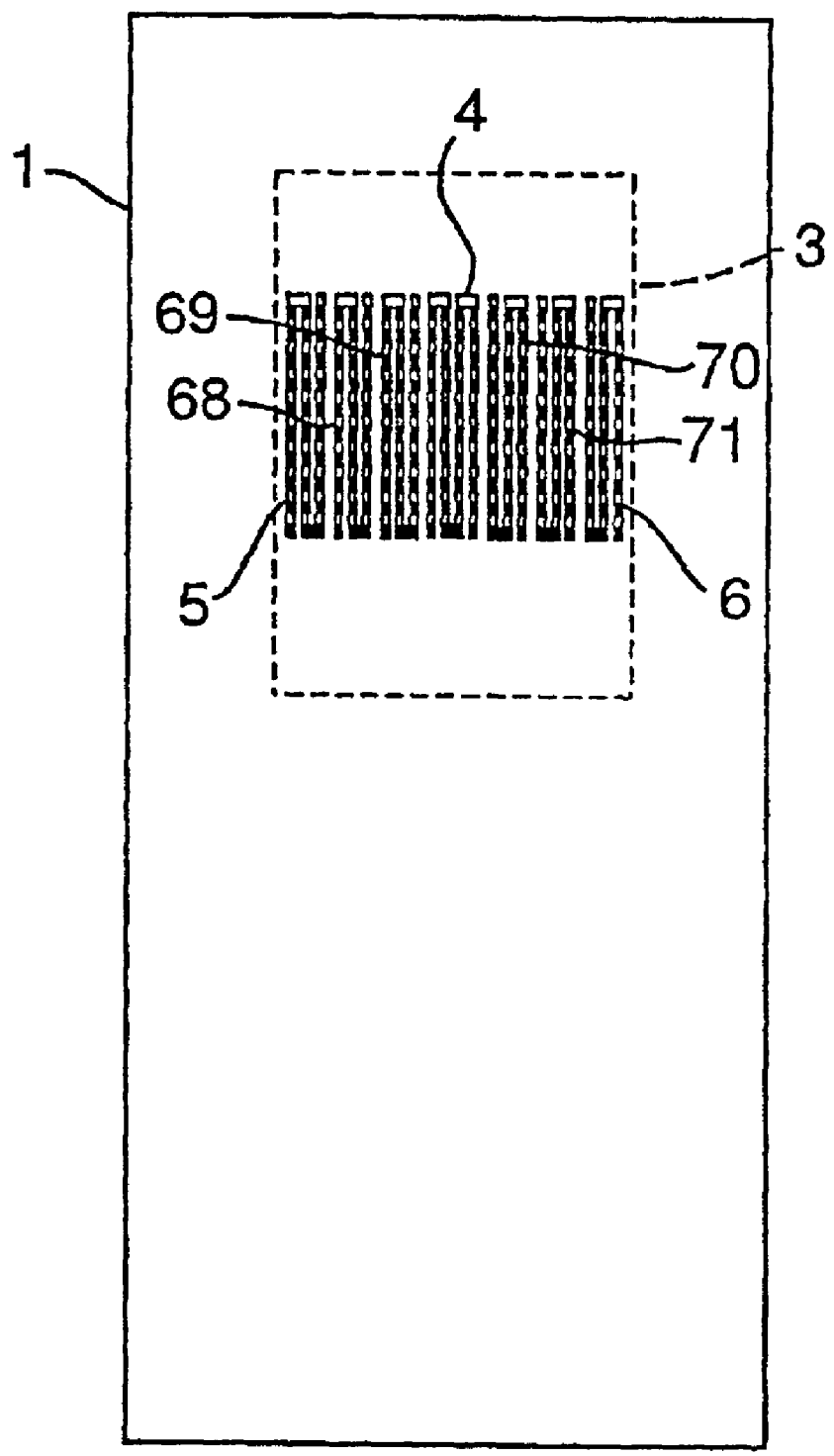
FIG. 34 is a view of a sensing section of a fluid flow measuring apparatus according to Embodiment 15.

FIG. 34 illustrates a sensing section of a fluid flow measuring apparatus according to Embodiment 15 of the present invention. The fluid flow measuring apparatus of Embodiment 15 has the center heating resistor 4 provided between the second heating resistor 69 and the third heating resistor 70. In the drawing, the wirings 9 and the pads 10 are identical to those shown in FIG. 25 and not illustrated. A constant temperature circuit is composed of the center heating resistor 4 (Rh), the upstream temperature sensing resistor 5 (Rsu), and the downstream temperature sensing resistor 6 (Rsd). The center heating resistor 4 is energized so that the average of the temperature measurements of the upstream temperature sensing resistor 5 and the downstream temperature sensing resistor 6 is maintained at a constant level. The arrangement of the constant temperature circuit is identical to that shown in FIG. 3.

The circuitry arrangement shown in FIG. 3 allows the upstream and the downstream temperature sensing resistors 5 and 6 to remain constant in the temperature average. The circuitry arrangement shown in FIG. 26 permits the upstream and the downstream temperature sensing resistors 5 and 6 to be equally controlled in the temperature level. As a result, the temperature levels of the two resistors 5 and 6 can be maintained constant throughout a range of the flow.

The circuitry arrangement of this embodiment can maintain the temperature of the upstream and the downstream temperature sensing resistors 5 and 6 at constant levels regardless of the flow, hence increasing the dynamic range. As the temperature change derived from a change in the flow can be inhibited thus improving the response of the apparatus. Moreover, as the temperature of the resistors is kept to 100° C., it can instantly evaporate drops of water attached to the resistors, hence minimizing unwanted water-related drifts of the response property.

Embodiment 16

Figure 35:
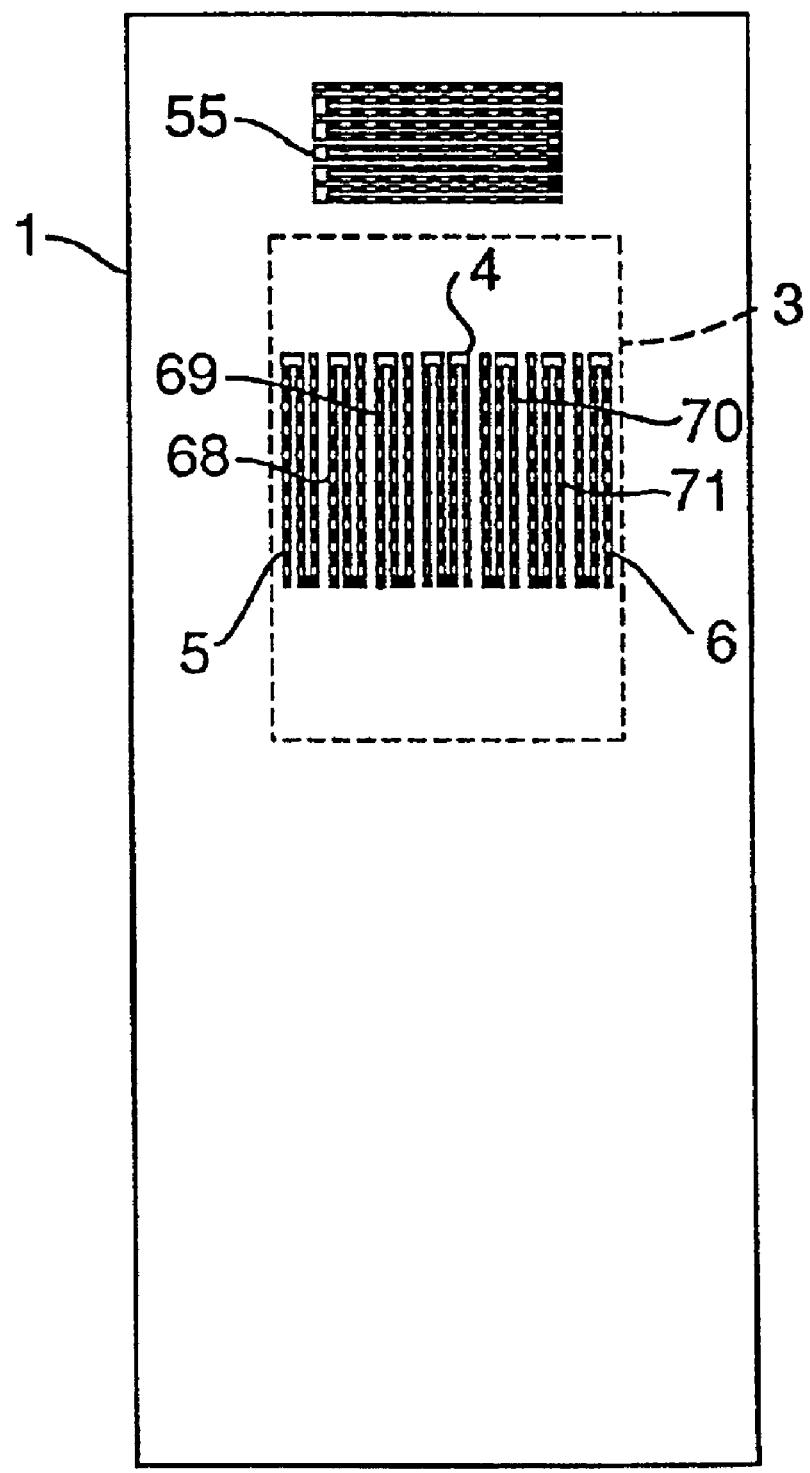
FIG. 35 is a view of a sensing section of a fluid flow measuring apparatus according to Embodiment 16.

FIG. 35 illustrates a sensing section of a fluid flow measuring apparatus according to Embodiment 16 of the present invention. In the drawing, the wirings 9 and the pads 10 are identical to those shown in FIG. 25 and not illustrated.

Embodiment 16 has a fluid temperature sensing resistor 55 (Ra) mounted on a silicon chip 1 thereof. The flow temperature sensing resistor 55 is distanced from the thinned region 3 so as to receive no thermal effects from the heating resistors 4, 68, 69, 70, and 71. The fluid flow temperature sensing resistor 55 may be etched at its back side to remove silicon and be formed on a second thinned region.

The fluid temperature sensing resistor 55 is installed in the circuitry arrangement shown in FIG. 17. This allows the average of the temperature level (Tsu) of the upstream temperature sensing resistor 5 and the temperature level (Tsd) of the downstream temperature sensing resistor 6 to depend on the temperature Ta of the fluid. The higher the fluid temperature Ta becomes, the higher the average of the two temperature levels of the upstream and the downstream temperature sensing resistors 5 and 6 becomes. The lower the fluid temperature Ta becomes, the lower the average of the two temperature levels of the upstream and the downstream temperature sensing resistors 5 and 6 are controlled. The relationship between the fluid temperature Ta and the average of the two temperature levels of the upstream and the downstream temperature sensing resistors 5 and 6 can be determined by the circuit constant R1 or R2 in Equation 13.

The arrangement and controlling method of this embodiment can compensate a change in the response caused by the fluid temperature change hence being improved in the thermal performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flow measuring apparatus for measuring flow of a fluid based on a difference in radiation of heat at an upstream side and at a downstream side of a heating member located in the flow of the fluid, comprising:

a heating member;

an upstream temperature sensor located at an upstream side of the heating member for measuring a first temperature;

a downstream temperature sensor located at a downstream side of the heating member for measuring a second temperature; and a circuit for controlling power supplied to the heating member to maintain at a fixed temperature an average of the first temperature measured by the upstream temperature sensor and the second temperature measured by the downstream temperature sensor.

2. The flow measuring apparatus according to claim 1, wherein the flow of the fluid is calculated from the difference between the first temperature measured by the upstream temperature sensor and the second temperature measured by the downstream temperature sensor.

3. The flow measuring apparatus according to claim 1, further comprising:

an upstream heating member located between the heating member and the upstream temperature sensor for generating heat based on power supplied to the upstream heating member and controlled by the circuit; and a downstream heating member located between the heating member and the downstream temperature sensor for generating heat based on power supplied to the downstream heating member and controlled by the circuit, wherein the circuit controls the power supplied to the upstream heating member and to the downstream heating member to maintain the first temperature measured by the upstream temperature sensor and the second temperature measured by the downstream temperature sensor substantially equal and the flow of the fluid is measured based on the difference between the respective powers.

4. The flow measuring apparatus according to claim 1, wherein the circuit modifies the fixed temperature based on temperature of the fluid.

5. The flow measuring apparatus according to claim 1, wherein the circuit modifies the fixed temperature based on the flow of the fluid.

6. A flow measuring apparatus for measuring flow of a fluid based on a difference in radiation of heat at an upstream side and at a downstream side of a heating member located in the flow of the fluid, comprising:

first, second, third, fourth, fifth, and sixth thermally sensitive resistors located in a row from an upstream side to a downstream side, each resistor generating heat and sensing temperature; and a circuit for controlling power supplied to each of the thermally sensitive resistors, wherein the circuit controls respective powers supplied to the third and the fourth thermally sensitive resistors to maintain temperatures of the second and the fifth thermally sensitive resistors substantially equal, said circuit controls respective powers supplied to the second and the fifth thermally sensitive resistors to maintain temperatures of the first and the sixth thermally sensitive resistors substantially equal, and said circuit measures the flow of the fluid based on the difference between the respective powers supplied to the third and the fourth thermally sensitive resistors and the difference between the respective powers supplied to the second and the fifth thermally sensitive resistors.

7. The flow measuring apparatus according to claim 6, further comprising a heating resistor located between the third and the fourth thermally sensitive resistors, wherein the circuit controls power supplied to the heating resistor to maintain an average temperature of the first and the sixth thermally sensitive resistors at a fixed temperature.

8. The flow measuring apparatus according to claim 7, wherein the circuit modifies the fixed temperature based on temperature of the fluid.

* * * * *